US010942034B2

United States Patent
Rasmussen et al.

(10) Patent No.: US 10,942,034 B2
(45) Date of Patent: *Mar. 9, 2021

(54) SHARED CONTROL OF VEHICLE FUNCTIONS

(71) Applicant: The DIRECTV Group, Inc., El Segundo, CA (US)

(72) Inventors: Matthew Rasmussen, San Pedro, CA (US); Harry Porudominsky, Westchester, CA (US); Kevin Tague, Los Angeles, CA (US); Dean Sakihama, Portland, OR (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 16/238,382

(22) Filed: Jan. 2, 2019

(65) Prior Publication Data

US 2019/0137992 A1 May 9, 2019

Related U.S. Application Data

(63) Continuation of application No. 15/441,172, filed on Feb. 23, 2017, now Pat. No. 10,180,682.

(51) Int. Cl.
*G01C 21/34* (2006.01)
*H04L 29/08* (2006.01)
(Continued)

(52) U.S. Cl.
CPC ..... *G01C 21/3415* (2013.01); *B60H 1/00735* (2013.01); *G01C 21/343* (2013.01);
(Continued)

(58) Field of Classification Search
CPC ............. G01C 21/3415; G01C 21/343; H04W 12/0609; H04W 4/44; B60H 1/00735;
(Continued)

(56) References Cited

U.S. PATENT DOCUMENTS 6,148,253 A 11/2000 Taguchi et al.
6,664,888 B1 12/2003 Bishop
(Continued)

FOREIGN PATENT DOCUMENTS

EP 0739816 A1 10/1996
WO 2015018259 A1 2/2015

OTHER PUBLICATIONS

Office Action dated Apr. 10, 2018 for U.S. Appl. No. 15/441,172, 44 pages.

*Primary Examiner* — Dale W Hilgendorf
(74) *Attorney, Agent, or Firm* — Amin, Turocy & Watson, LLP

(57) ABSTRACT

Control of functions associated with a vehicle can be shared between a vehicle operator and a communication device and associated user. The communication device can comprise a control component used to facilitate controlling or sharing control of certain functions associated with the vehicle. The functions can relate to vehicle operation, navigation system, climate control system, media system, or other functions. The communication device can be in the vehicle or can be remotely located from the vehicle. The control component can communicate with a vehicle control system of the vehicle to gain access rights to certain control functions to facilitate controlling certain functions of the vehicle. In instances where vehicle control is shared with more than one communication device, the vehicle control system or vehicle operator, which can be a device or a person, can resolve any conflicts between control requests or commands received from the communication devices.

20 Claims, 10 Drawing Sheets

(51) Int. Cl.
  *H04L 29/06* (2006.01)
  *H04W 12/06* (2009.01)
  *B60H 1/00* (2006.01)
  *G05D 1/00* (2006.01)
  *H04W 4/44* (2018.01)
(52) U.S. Cl.
  CPC ............ *G05D 1/0011* (2013.01); *H04L 63/08*
    (2013.01); *H04L 63/10* (2013.01); *H04L 67/12*
    (2013.01); *H04W 12/0609* (2019.01); *H04W*
    *4/44* (2018.02)
(58) Field of Classification Search
  CPC ....... G05D 1/0011; H04L 63/10; H04L 67/12;
    H04L 63/08
  See application file for complete search history.

(56) References Cited

U.S. PATENT DOCUMENTS

| | | | |
|---|---|---|---|
| 7,484,008 B1 | 1/2009 | Gelvin et al. | |
| 8,522,320 B2 | 8/2013 | Kleve et al. | |
| 9,178,973 B2 | 11/2015 | Lee et al. | |
| 9,326,089 B2 | 4/2016 | Xia et al. | |
| 9,417,834 B2 | 8/2016 | Ricci | |
| 9,479,907 B2 | 10/2016 | Nespolo et al. | |
| 9,489,544 B2 | 11/2016 | Naitou et al. | |
| 9,569,403 B2 | 2/2017 | Peterson et al. | |
| 9,639,688 B2 | 5/2017 | Westra et al. | |
| 10,180,682 B2 * | 1/2019 | Rasmussen et al. | ......... G01C 21/3415 |
| 2010/0097239 A1 | 4/2010 | Campbell et al. | |
| 2010/0333146 A1 | 12/2010 | Pickney et al. | |
| 2012/0071151 A1 | 3/2012 | Abramson et al. | |
| 2013/0211623 A1 | 8/2013 | Thompson et al. | |
| 2014/0163771 A1 | 6/2014 | Demeniuk | |
| 2014/0297064 A1 | 10/2014 | Park et al. | |
| 2014/0309813 A1 | 10/2014 | Ricci | |
| 2014/0309863 A1 * | 10/2014 | Ricci | ...................... H04L 67/12 701/36 |
| 2014/0354402 A1 | 12/2014 | Joao | |
| 2015/0081133 A1 | 3/2015 | Schulz | |
| 2016/0090055 A1 | 3/2016 | Breed | |

* cited by examiner

SHARED CONTROL OF VEHICLE FUNCTIONS

RELATED APPLICATION

The subject patent application is a continuation of, and claims priority to, U.S. patent application Ser. No. 15/441,172 (now U.S. Pat. No. 10,180,682), filed Feb. 23, 2017, and entitled "SHARED CONTROL OF VEHICLE FUNCTIONS," the entirety of which application is hereby incorporated by reference herein.

TECHNICAL FIELD

This disclosure relates generally to communication networks, e.g., to shared control of vehicle functions.

BACKGROUND

Vehicles, such as, for example, automobiles, planes, trains, buses, and ships, are increasingly employing communication networks that can be made available to users. For example, a user can connect his or her communication device to a communication network of a vehicle. The communication device can be, for example, a mobile phone, a laptop computer, an electronic pad or tablet, an electronic watch, an electronic eyewear, or an electronic gaming device. The user can use the communication device to access information (e.g., web sites) and/or communicate information (e.g., send or receive messages, such as text messages or emails) via a communication connection with the communication network of the vehicle.

The above-described description is merely intended to provide a contextual overview relating to communication networks, and is not intended to be exhaustive.

DETAILED DESCRIPTION

Figure 1:
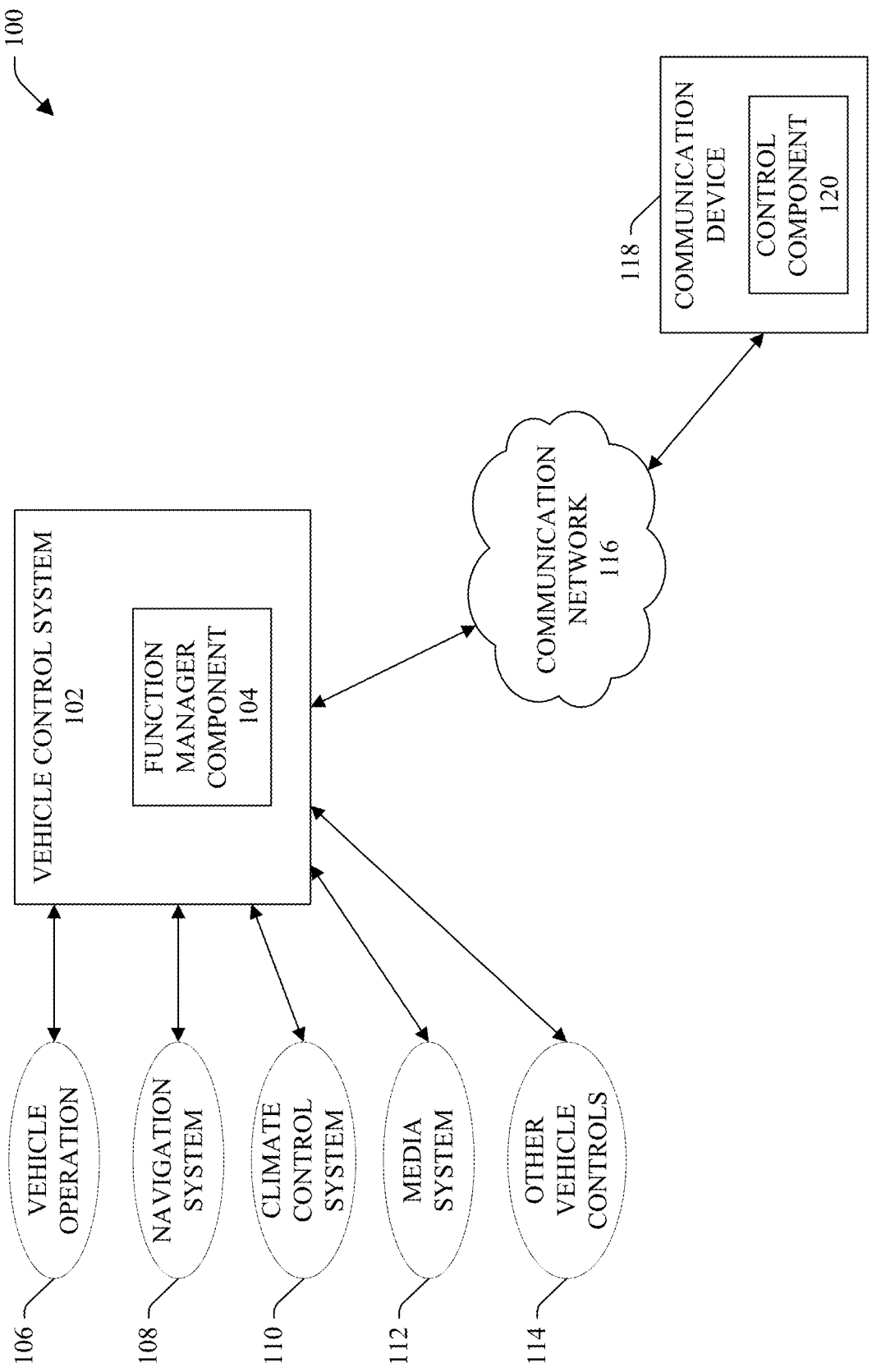
FIG. 1 illustrates a block diagram of an example system that can facilitate sharing control of functions associated with a vehicle between an operator of the vehicle and a communication device(s) and associated communication device user(s), in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Vehicles, such as, for example, automobiles, planes, trains, buses, and ships, are increasingly employing communication networks that can be made available to users. For example, a vehicle can comprise a communication network to which one or more users may connect their respective communication devices. A communication device user can connect the communication device to the communication network of the vehicle. The communication device can be, for example, a mobile phone, a laptop computer, an electronic pad or tablet, an electronic watch, an electronic eyewear, or an electronic gaming device. The user can use the communication device to access information (e.g., web sites) and/or communicate information (e.g., send or receive messages, such as text messages or emails) via a communication connection with the communication network of the vehicle.

A user who has a communication device connected to a conventional communication network of a vehicle may be limited with regard to what information the user is able to access, or what things the user is able to control, using the communication device via the conventional communication network. For example, the user who has a communication device connected to the conventional communication network of the vehicle may be limited to being able to access and play media received from content source providers, send or receive messages, and/or access information from web sites, via the conventional communication network.

To that end, techniques for sharing control of functions associated with a vehicle between an operator of the vehicle and a communication device(s) and associated communication device user(s) are presented. The vehicle can be, for example, an automobile, a bus, a plane, a train, a boat, or a ship.

The communication device (e.g., mobile phone, computer, electronic pad or tablet, electronic eye wear, smart watch, . . . ) of a user can comprise a control component that can be used to facilitate controlling or sharing control of certain functions associated with the vehicle. The functions associated with the vehicle can relate to vehicle operation (e.g., speed, acceleration, braking, steering, gear shifting, of the vehicle), navigation system of the vehicle, climate control system of the vehicle, media system of the vehicle, or other functions (e.g., power windows, power locks, convertible top, sun roof, moonroof, seat adjustment controls).

The communication device and associated user can be located in the vehicle or can be remotely located from the vehicle. For example, the user can be a passenger in the vehicle, or the user can be located at a remote location (e.g., home, office at work, . . . ) outside of the vehicle. The communication device, using the control component, can communicate with a vehicle control system of the vehicle via a communication network to authenticate the communication device and associated user with the vehicle control system and gain certain access rights with regard to certain control functions associated with the vehicle to facilitate controlling certain functions associated with the vehicle. If the communication device is located inside the vehicle, the communication device can connect (e.g., wirelessly connect) to the vehicle control system via, for example, a Wi-Fi network, gigabit wireless (Gi-Fi) network, Hi-Fi network (e.g., providing higher gigabit data communication than Gi-Fi or Wi-Fi), BLUETOOTH, or other type of communication network. If the communication device is located in a remote location outside of the vehicle, the communication device can connect (e.g., wirelessly connect) to the vehicle control system via a macro communication network (e.g., a core network, an Internet Protocol (IP)-based network, a cellular network).

Based at least in part on the access rights granted to the communication device and associated user by the vehicle control system, the user can use the communication device to facilitate controlling or at least sharing the control of certain functions associated with the vehicle. With regard to a function associated with the vehicle that the communication device and user are authorized to control, the user can use the control component to communicate a command or request relating to the function to the vehicle control system to facilitate controlling the function associated with the vehicle. In response to receiving the command or request from the communication device, the vehicle control system can process the command or request. If, for example, the vehicle control system determines that desired controlling of the function associated with the vehicle contained in the command or request relating to the function is permitted, in accordance with the access rights of the communication device and user, and in accordance with defined control criteria, the vehicle control system can control (e.g., adjust, modify) the function associated with the vehicle based at least in part on the command or request.

There can be instances where control of certain functions of the vehicle is shared with more than one communication device and more than one communication device user. In such instances where vehicle control is shared with more than one communication device, the vehicle control system or vehicle operator, which can be a device or a person, can resolve any conflicts between control requests or commands received from the communication devices. For example, the vehicle control system can facilitate enabling the communication devices and associated communication device users to negotiate with each other and/or with the vehicle control system with regard to control of a certain function associated with the vehicle to facilitate resolving a conflict regarding control of the certain function. If, for some reason, the negotiation is unable to resolve the conflict, the vehicle control system or vehicle operator can render a decision regarding control of the certain function to resolve the conflict.

These and other aspects and embodiments of the disclosed subject matter will now be described with respect to the drawings.

Referring now to the drawings, FIG. 1 illustrates a block diagram of an example system 100 that can facilitate sharing control of functions associated with a vehicle between an operator of the vehicle and a communication device(s) and associated communication device user(s), in accordance with various aspects and embodiments of the disclosed subject matter. The system 100 can comprise a vehicle control system 102 that can control various functions associated with a vehicle. The vehicle control system 102, or at least a portion of the vehicle control system 102, can be located inside the vehicle. The vehicle can be, for example, an automobile, a bus, a plane, a train, a boat, or a ship.

In some implementations, the operator of the vehicle can be a person driving the vehicle. In other implementations, the operator of the vehicle can be a device (e.g., an electronic entity or robot) that can be operating (e.g., driving) the vehicle, wherein the device can be part of or associated with the vehicle control system 102.

The vehicle control system 102 can comprise a function manager component 104 that can facilitate controlling (e.g., modifying, adjusting) the various functions associated with a vehicle and managing the sharing of control of the various functions with communication devices and associated users. The functions associated with the vehicle can comprise or relate to vehicle operation 106 (e.g., ignition, speed, acceleration, cruise control, braking, steering, and/or gear shifting, of the vehicle), a navigation system 108 of the vehicle, a climate control system 110 of the vehicle, a media system 112 of the vehicle, or other vehicle functions or controls 114 (e.g., power windows, power locks, vehicle doors, hood, trunk, convertible top, sun roof, moonroof, power mirrors, lights, seat adjustment controls, steering wheel adjustment controls).

The navigation system 108 of the vehicle can comprise or be associated with (e.g., connected to) location services that can identify the current location of the vehicle, identify a starting location (e.g., starting point) of travel of the vehicle, identify a desired destination (e.g., end) location of travel, identify a best travel route and/or alternate travel route for the vehicle to travel between the starting location and the destination location, identify locations of points of interest (e.g., landmarks, restaurants, gas stations, stores, hospitals, . . . ), and/or other vehicle-navigation-related location services. In some implementations, the navigation system 108 can be, can comprise, or can be associated with a global positioning system (GPS) device.

The navigation system 108 also can provide audio and/or visual notifications to the vehicle operator and/or others (e.g., passengers, remote users outside of the vehicle) to facilitate notifying the vehicle operator and/or others with regard to aspects of vehicle travel (e.g., the distance before the next turn, when the vehicle is to turn, what direction the vehicle is to turn, when a wrong turn has been made, when a travel route has been updated or modified, . . . ). The navigation system 108 further can save information relating to previously input addresses or locations. The function manager component 104 and/or an authorized communication device and associated authorized user can facilitate controlling the operation of the navigation system 108, the selection of destination locations to which the vehicle is to travel, the selection of a travel route that the vehicle is to travel between a starting or current location and a destination location, notifications presented by the navigation system 108, and/or other navigation-related functions.

The climate control system 110 can be employed to adjust the climate conditions (e.g., temperature, air conditioning) in the vehicle. The climate control system 110 can comprise heater functions, air conditioner functions, fan functions, air vent functions, or other functions relating to climate control. The function manager component 104 and/or an authorized communication device and associated authorized user can facilitate controlling operation of the climate control system 110 to facilitate adjusting the temperature level, the air conditioning level, fan level, or other characteristics relating to climate control.

The media system 112 can present video content and audio content to users in the vehicle via one or more displays (e.g., display screens) and/or a set of speakers of or associated with the vehicles, and/or via communication devices (e.g., display screen, speakers, and/or earbuds of communication devices) of users within the vehicle. The media system 112 can comprise or be associated with a compact disc (CD) player, a digital versatile disc (DVD) player, a radio (e.g., terrestrial radio, satellite radio), a television-type device or system (e.g., terrestrial television channels, cable television system, satellite television system), one or more media (e.g., video, audio) streaming applications or web sites, or other media devices or applications. In some implementations, the media system 112 can receive video or audio content from a communication device of a user (e.g., passenger) in the vehicle, and can present (e.g., share) that video or audio content with one or more other communication devices of users (e.g., other passengers) in the vehicle. In other implementations, the media system 112 can receive video or audio content from a remote communication device of a remote user (e.g., parent of a child in the vehicle or another user), and can present such video or audio content to one or more communication devices of one or more users (e.g., child(ren) of the parent or other users) in the vehicle (e.g., when the remote communication device and remote user have permission to access and control the media system 112). The function manager component 104 and/or an authorized communication device and associated authorized user can facilitate controlling the media system 112, including the presentation of video or audio content via the media system 112.

The media system 112 can be associated with respective content providers and content provider devices or systems. The respective content providers can comprise, for example, one or more applications, respective television channels that can be accessed via a cable television service, respective television channels that can be accessed via a satellite television service, respective television channels that can be accessed via a terrestrial television service, one or more video-on-demand services, one or more pay-per-view services, one or more websites, respective radio channels that can be accessed via a cable television service, respective radio channels that can be accessed via a satellite television service, respective radio channels that can be accessed via a terrestrial radio service, and/or one or more other devices (e.g., a computer, a smart phone, an electronic pad or tablet, an electronic gaming device) that can be associated with the media system 112 (e.g., via the micro communication network or the macro communication network).

In certain implementations, the media system 112 can comprise a device (not shown) that can be or comprise a media device (e.g., a set-top box (STB) or set-top unit (STU)). The device can be employed to stream, record, store, and/or present (e.g., communicate, display) content (e.g., video content, audio content) via a presentation (e.g., display) component (e.g., a communication device integrated with the vehicle) or a communication device 118 of a user that is associated with the media system 112.

The system 100 also can comprise a communication network 116 that can be associated with (e.g., connected to) the vehicle control system 102. The communication network 116 also can be associated with (e.g., connected to) one or more communication devices, including communication device 118. The communication device 118 can be situated within the vehicle or can be in a remote location that can be outside of the vehicle. For example, the communication device 118 can be a communication device used by a user (e.g., passenger) within the vehicle. As another example, the communication device 118 can be a remote communication device used by a remote user who is outside of the vehicle (e.g., a parent of a child who is inside the vehicle).

The communication network 116 can be or can comprise a macro communication network and/or a micro communication network. For instance, the communication network 116 can be or can comprise a micro communication network (e.g., a vehicle communication network) that can be located within the vehicle and can be associated with (e.g., connected to) the vehicle control system 102. A communication device located inside the vehicle (or in proximity to (e.g., within a defined distance of) the vehicle) can connect to the vehicle control system 102 via the micro communication network of the communication network 116. The micro communication network can be, can comprise, or can be associated with Wi-Fi, Gi-Fi, Hi-Fi, BLUETOOTH, ZIGBEE, etc., and/or can be associated with (e.g., connected to) the macro communication network. The micro or local communication network can be or can comprise, for example a local area network (LAN), that can facilitate connecting certain devices (e.g., communication devices) associated with the micro or local communication network to each other and/or to the macro communication network.

The communication network 116 also can be or can comprise a macro communication network that can operate inside and outside of the vehicle, wherein the vehicle control system 102 can communicate with communication devices (e.g., remotely located communication devices) that are located outside the vehicle. A communication device located outside (e.g., remote from) the vehicle can connect to the vehicle control system 102 via the macro communication network of the communication network 116. The macro communication network can be, can comprise, or can be associated with a core network, a cellular network, an IP-based network, Wi-Fi, Gi-Fi, Hi-Fi, BLUETOOTH, ZIGBEE, etc.

The communication device 118 can comprise or be associated with a control component 120 that can be employed to facilitate controlling (e.g., sharing control) of the various functions of the vehicle, in accordance with the defined control criteria, and access and control rights granted to the communication device 118 and/or the associated user. In some implementations, the communication device 118 can download, via the communication network 116, an application (e.g., a vehicle shared control application) that can include the control component 120. In other implementations, the communication device 118 can access, via the communication network 116, a web site that can present or provide the control component 120 to the communication device 118.

If the user of the communication device 118 desires to control one or more functions of the vehicle, the user can use the communication device 118 to communicate with the vehicle control system 102 via the communication network 116 to authenticate the communication device 118 and user with the vehicle control system 102. Via the communication network 116, the communication device 118 and user can communicate authentication information to the vehicle control system 102. The function manager component 104 can analyze the authentication information and can compare it to stored authentication information (e.g., associated with the communication device 118 and/or user) that the function manager component 104 can have stored in a data store. If the function manager component 104 determines that the authentication information received from the communication device 118 satisfactorily matches the stored authentication information, the function manager component 104 can determine that the communication device 118 and associated user are authenticated, and can grant the communication device 118 and associated user a set of access and control rights that the communication device 118 and associated user are permitted to have, in accordance with the defined control criteria and/or an account or subscription associated with the communication device 118 and/or user. The set of access and control rights can define or indicate the level of access the communication device 118 and user can have to the vehicle control system 102 and the level or type of control (e.g., shared control) that the communication device 118 and user can have over the various functions associated with the vehicle.

The level or type of authentication employed to authenticate the communication device 118 and associated user can be based at least in part on the type of communication device (e.g., mobile phone, computer, electronic eye or body wear, electronic pad or tablet, . . . ), type of authentication information provided (e.g., phone number of communication device, biometric information (e.g., eye or iris features, fingerprint, facial features) associated with the user, media access control (MAC) address, IP address, and/or device ID number, . . . ). For example, a first level or type of authentication can be employed with regard to a first type of communication device (e.g., mobile phone or other mobile device) that is associated with (e.g., has and presents) a phone number. A second level or type of authentication can be employed with regard to a second type of communication device (e.g., a computer) that is associated with other identification or authentication information.

For instance, a mobile communication device that presents a phone number as part of authentication may be considered more trustworthy than another type of communication device (e.g., desktop computer) that provides a different type of identification information (e.g., IP address) than a phone number. With regard to a mobile communication device presenting a phone number as part of authentication, the function manager component 104 can, for example, authenticate the mobile communication device and associated user based at least in part on the phone number and a first subset of additional authentication information (e.g., a password or passcode, or biometric information associated with the user). With regard to a different type of communication device (e.g., desktop computer) that provides a different type of identification information than a phone number, the function manager component 104 can, for example, authenticate the different type of communication device and associated user based at least in part on the different type of authentication information (e.g., IP address) and a second subset of additional authentication information (e.g., a username, an email address, a password or passcode, answers to verification questions, and/or biometric information associated with the user).

The communication device of a primary user (e.g., a parent) and the primary user can be associated with an account and one or more sub-accounts associated with the vehicle (e.g., an account and sub-account(s) associated with a vehicle subscription service), wherein, for example, an associated communication device and associated user (e.g., a child) of the primary user can be associated with one of the sub-accounts. In some implementations, the function manager component 104 can link authentication of and/or the granting of access and control rights to the primary user and the communication device of the primary user with an associated user and the associated communication device of the associated user. For example, if the associated user and the primary user are not inside the vehicle or are not expected to be inside the vehicle within a defined amount of time of a current time, the function manager component 104 can determine that the primary user and the communication device of the primary user are not to be authenticated and/or granted access and control rights with regard to the various functions associated with the vehicle, even if the primary user uses the communication device of the primary user to attempt to authenticate with the vehicle control system 102. The function manager component 104 can communicate a notification message to the communication device of the primary user to inform the primary user that the primary user has the wrong vehicle (e.g., that the associated user is not in or is not expected to be in that vehicle during the relevant period of time).

In instances where the communication device 118 is located inside or outside the vehicle, is connected to the vehicle control system 102, and is authenticated with the function manager component 104, the communication device 118 and associated user (e.g., vehicle passenger, or remote user) can be granted a certain subset of access and control rights to control (e.g., share control) of certain functions of the various functions associated with the vehicle, based at least in part on the user, preferences associated with the user, and/or a subscription or account (e.g., main account, sub-account) associated with the user or subscription, in accordance with the defined control criteria.

For example, a first user (e.g., a minor child vehicle passenger) having a first type of account (e.g., a sub-account) can have a first subset of access and control rights to control (e.g., share control) of a first subset of functions of the various functions associated with the vehicle. The first subset of functions can include, for instance, control or limited control (e.g., limited shared control) over media controls (e.g., selection control, volume control, presentation or playback control) with regard to media content (e.g., video content, audio content) presented by the media system 112, control or limited control (e.g., limited shared control) over the climate control system 110, control or limited control (e.g., limited shared control) over the navigation system 108 with regard to travel routes of the vehicle, and/or control or limited control (e.g., limited shared control) over other vehicle functions 114 (e.g., controls relating to the seat of the first user).

As another example, a second user (e.g., an adult passenger, or a remote user (e.g., a parent of a minor child who is in the vehicle) having a second type of account (e.g., a main account) can have a second subset of access and control rights to control (e.g., share control) of a second subset of functions of the various functions associated with the vehicle, wherein the second subset of access and control rights can be different from the first subset of access and control rights. The second subset of functions can include, for instance, control or limited control (e.g., limited shared control) over operation (e.g., speed, cruise control, . . . ) of the vehicle, control or limited control over media controls with regard to media content presented by the media system 112, control or limited control over the climate control system 110, control or limited control over the navigation system 108 with regard to travel routes of the vehicle, and/or control or limited control over other vehicle functions 114 (e.g., controls relating to the seat of the second user, controls relating to the sun roof, moonroof, or convertible top, controls relating to one or more windows of the vehicle, . . . ).

For instance, the first user and associated communication device may have certain access and control rights in the first subset to access certain media content (e.g., certain television shows, movies, and/or music) on the communication device via the media system 112, access to seat controls (e.g., control to move the seat forward or back and/or control to recline the seat) for the first user's seat in the vehicle to enable the first user to use the communication device to adjust such seat controls, and read-only access to the navigation system 108 to allow the first user to use the communication device to display navigation information, such as the remaining travel distance and travel time to the destination. However, the first user and associated communication device may not have access and control rights to control vehicle operation (e.g., vehicle speed, braking, . . . ), access (e.g., interactive access) to the navigation system 108 to modify or facilitate modifying the navigation (e.g., travel route and/or destination) of the vehicle, access the climate control system 110 to modify climate controls (e.g., temperature control, air condition control, . . . ).

Meanwhile, the second user and associated communication device may have certain other access and control rights in the second subset that can allow the second user to use the associated communication device to communicate a request or command the vehicle to modify its speed (e.g., increase speed, decrease speed) or set a maximum speed (e.g., do not travel faster than 55 miles per hour (MPH) on the freeway (even if the speed limit is 65 MPH)), allow the second user to use the associated communication device to communicate a request or command to the navigation system 108 to modify or facilitate modifying the navigation (e.g., travel route and/or destination) of the vehicle, and/or allow the second user to use the associated communication device to communicate a request or command to the media system 112 to place a restriction(s) on the media content that can be accessed and perceived (e.g., viewed, listened to) by another user (e.g., minor child of the second user) associated with the second user's account. The content restriction(s) can comprise, for example, that the media system 112 is not to allow the other associated user and his/her communication device to access adult-oriented or potentially adult-oriented media content (e.g., movies rated "R" or higher; video content from adult-oriented web sites) and music with explicit adult or profane language, and/or to only allow the other associated user and his/her communication device to access content related to school work.

In response to the vehicle control system 102 receiving, from the communication device 118 of a user, a request or command (e.g., request or command message) relating to control of a function associated with the vehicle, the function manager component 104 can process the request or command For instance, the function manager component 104 can analyze information in the request or command and information relating to the access and control rights associated with the communication device 118 and associated user. Based at least in part on the results of such analysis, the function manager component 104 can determine whether the communication device 118 and associated user have the access or control rights that allow the communication device 118 and associated user to control (e.g., share control) of the function, in accordance with the defined control criteria.

If the function manager component 104 determines that the communication device 118 and associated user have the access and control rights with regard to control of the function associated with the request or command, the function manager component 104 can determine whether there is any conflict or other problem with implementing the control of the function. For example, if the control action indicated in the request or command relates to controlling the speed of the vehicle, the function manager component 104 can determine whether the desired speed-related control action conflicts with another speed-related control action received by the vehicle control system 102 from another authorized user or conflicts or violates with an applicable law (e.g., speed limit).

If the function manager component 104 determines that the communication device 118 and associated user have the access and control rights with regard to control of the function associated with the request or command and determines that there is no conflict or other problem with implementing the control of the function, the function manager component 104 can implement the desired control of the function (e.g., can modify the speed of the vehicle, in accordance with the desired speed-related control action).

If the function manager component 104 determines that the communication device 118 and associated user do not have the access and control rights with regard to control of the function associated with the request or command, the function manager component 104 can determine that the desired control action is not to be implemented by the vehicle control system 102. The function manager component 104 also can generate a denial message that indicates the control action requested by the user via the communication device 118 has been denied, and can transmit the denial message to the communication device 118 via the communication network 116.

In some implementations, if a user and associated communication device (e.g., 118) do not have certain access and control rights (e.g., control rights regarding controlling functions relating to vehicle operation, such as speed), the application or web site accessed by the communication device can control the presentation of control buttons on the communication device, wherein certain control buttons, which are related to the certain access and control rights the user and associated communication device do not have, are not presented on or to the communication device and associated user. With regard to other control buttons relating to other access and control rights that the user and associated communication device have, the application or web site can control the presentation of control buttons on the communication device such that the other control buttons can be presented on or to the communication device and associated user.

There can be instances where control of certain functions of the vehicle is shared with more than one communication device and more than one communication device user. In such instances where vehicle control is shared with more than one communication device, the vehicle control system 102 (e.g., the function manager component 104) or vehicle operator, which can be a device or a person, can resolve any conflicts between control requests or commands received from the communication devices. For example, the function manager component 104 can facilitate enabling the communication devices and associated users to negotiate with each other and/or with the vehicle control system 102 with regard to control of a certain function associated with the vehicle to facilitate resolving a conflict regarding control of the certain vehicle function. If, for some reason, the negotiation is unable to resolve the conflict, the function manager component 104 or vehicle operator can render a decision regarding control of the certain function to resolve the conflict.

Figure 2:
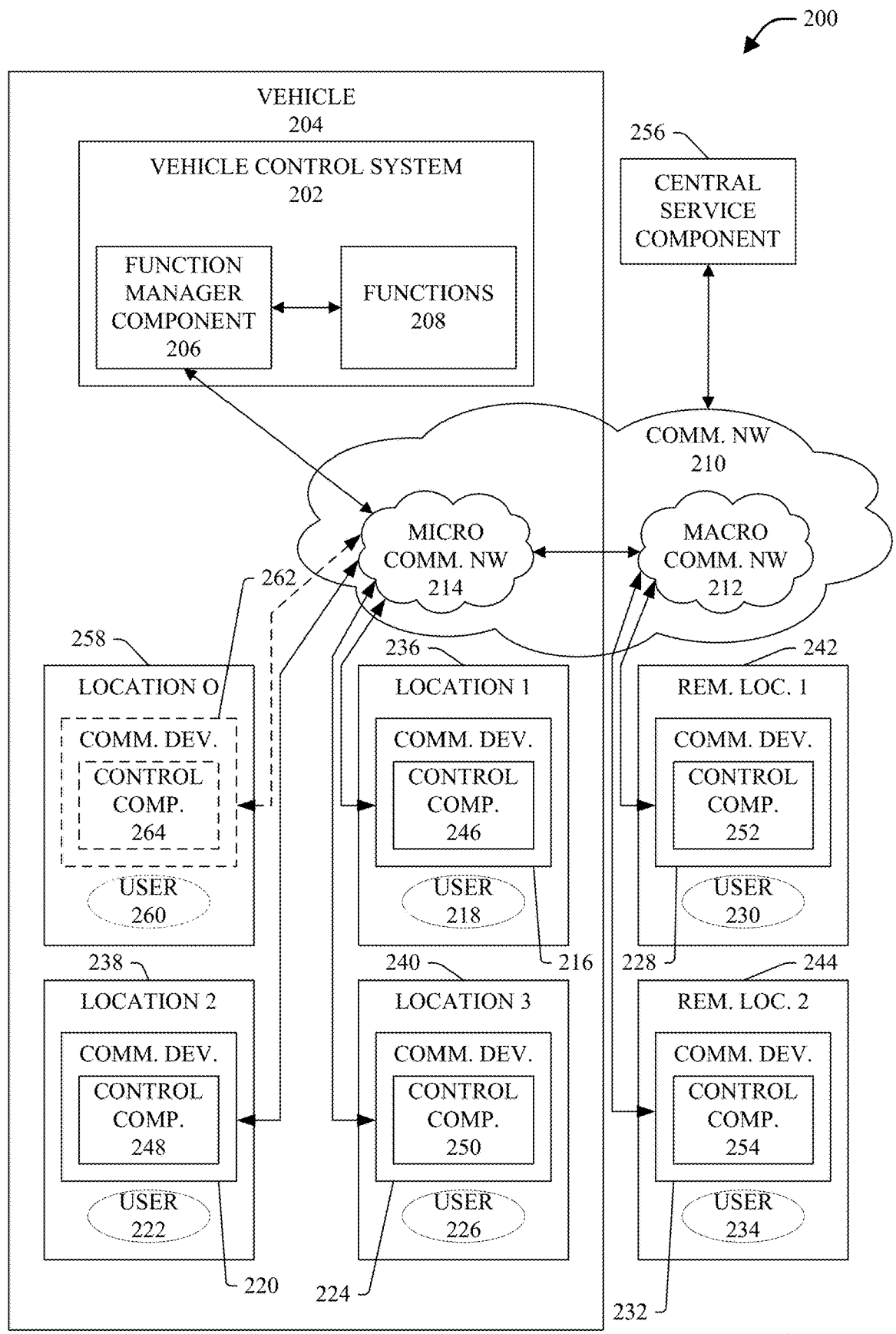
FIG. 2 presents a block diagram of another example system that can facilitate sharing control of functions associated with a vehicle between an operator of the vehicle and a communication device(s) and associated communication device user(s), in accordance with various aspects and embodiments of the disclosed subject matter.

Referring to FIG. 2, FIG. 2 presents a block diagram of another example system 200 that can facilitate sharing control of functions associated with a vehicle between an operator of the vehicle and a communication device(s) and associated communication device user(s), in accordance with various aspects and embodiments of the disclosed subject matter. The system 200 can comprise a vehicle control system 202 that can control various functions associated with a vehicle 204. The vehicle control system 202, or at least a portion of the vehicle control system 202, can be located inside the vehicle 204.

In some implementations, the vehicle 204 can be an autonomous or semi-autonomous vehicle, wherein the vehicle 204 can comprise an operator, which can be a robot or other device that can operate the vehicle 204 and/or can share operation of the vehicle with a person (e.g., a person who can be seated in a driver's seat of the vehicle 204). In other implementations, the vehicle 204 can be operated by a person who can be seated in the driver's seat of the vehicle 204.

In certain implementations, the vehicle 204 can be owned by a user(s) (e.g., a parent(s)), and may be used by the user(s) and/or another user(s) (e.g., a child(ren) of the parent(s) who has a driver's license). In other implementations, the vehicle 204 may be associated with a vehicle subscription service (e.g., a vehicle subscription, rental, or transportation service). The vehicle subscription service can comprise a plurality of vehicles that can be dispatched to various locations to pick up customers (e.g., persons) or items (e.g., packages, groceries, . . . ) of customers who have or are associated with subscriptions to the vehicle subscription service, and can transport the customers or items of customers to desired destinations, in accordance with their respective subscriptions.

In some implementations, a vehicle of the vehicle subscription service can be provided for persons who have certain characteristics (e.g., who meet certain criteria). For example, some vehicles of the service may only be available to pick up, transport, and deliver minor children or minor children of a certain age group (e.g., children under 18 years of age; children who are 12 years of age or younger; children who are between 6 and 12 years of age; . . . ). Other vehicles of the service may be available to adults only, or still other vehicles may be available to adults or children. The use restrictions of vehicles also can vary based at least in part on time (e.g., certain vehicles are restricted for use to transport school-age students during time periods before and after school hours).

Respective vehicle subscription services of respective users (e.g., customers) can be associated with respective priority rankings or service levels. For example, a first user can have a first vehicle subscription that has a higher priority rank than a second vehicle subscription of a second user. For instance, the first user may have purchased a higher quality vehicle subscription than the second user, and, as a result, the first user can have higher service levels or higher priority ranking than the second user with regard to vehicle services associated with vehicle subscriptions. As an example, if the first user (or another user associated with the first user's subscription account) and the second user (or another user associated with the second user's subscription account) are in the same vehicle, the first user (or associated user) can be given priority over the second user (or associated user) with regard to certain functions or services associated with the vehicle, in accordance with their respective vehicle subscriptions, respective priority rankings, and the defined control criteria, as more fully disclosed herein. The priority with regard to certain functions or services associated with the vehicle can relate to, for example, preference or priority with regard to vehicle speed, preference or priority with regard to pick up or drop off times, and/or preference or priority with regard to travel route of the vehicle.

The vehicle control system 202 can comprise a function manager component 206 that can facilitate controlling the various functions 208 associated with a vehicle 204 and managing the sharing of control of the various functions with communication devices and associated users. The various functions 208 can relate to operation of the vehicle 204, the navigation system of the vehicle 204, the climate control system of the vehicle 204, the media system of the vehicle 204, or other systems or components of the vehicle 204.

The system 200 can include a communication network 210 (COMM. NW 210) that can be associated with (e.g., connected to) the vehicle control system 202. The communication network 210 also can be associated with (e.g., connected to) one or more communication devices, which can be located inside or outside of the vehicle 204.

The communication network 210 can comprise a macro communication network 212 (MACRO COMM. NW 212) and/or a micro communication network 214 (MICRO COMM. NW 214). The macro communication network 212 can operate outside and/or inside of the vehicle, wherein the vehicle control system 202 can communicate with communication devices (e.g., remotely located communication devices) that are located outside the vehicle 204. A communication device located outside (e.g., remote from) the vehicle 204 can connect to the vehicle control system 202 via the macro communication network 212. The macro communication network 212 can be, can comprise, or can be associated with a core network, a cellular network, an IP-based network, Wi-Fi, Gi-Fi, Hi-Fi, BLUETOOTH, ZIGBEE, etc.

The micro communication network 214 can be located within, or at least partially within, the vehicle 204 and can be associated with (e.g., connected to) the vehicle control system 202. A communication device located inside the vehicle 204 (or in proximity to (e.g., within a defined distance of) the vehicle 204) can connect to the vehicle control system 202 via the micro communication network 214. The micro communication network can be, can comprise, or can be associated with Wi-Fi, Gi-Fi, Hi-Fi, BLUETOOTH, ZIGBEE, etc., and/or can be associated with (e.g., connected to) the macro communication network 212. The micro communication network 214 can be or can comprise, for example a local area network (LAN), that can facilitate connecting certain devices (e.g., communication devices) associated with the micro communication network 214 to each other and/or to the macro communication network 212.

There can be a plurality of communication devices, wherein some communication devices can be located inside the vehicle 204 and other communication devices can be located outside the vehicle 204 in remote locations. For instance, communication device (COMM. DEV.) 216 associated with user 218, communication device 220 associated with user 222, and communication device 224 associated with user 226 can be located inside the vehicle 204. Communication device 228 associated with user 230 and communication device 232 associated with user 234 can be located outside of the vehicle 204.

The user 218 and associated communication device 216 can be in a first location (location 1) 236 (e.g., first seat) inside the vehicle 204, the user 222 and associated communication device 220 can be in a second location (location 2) 238 (e.g., second seat) inside the vehicle 204, and communication device 224 associated with user 226 can be in a third location (location 3) 240 (e.g., third seat) inside the vehicle 204. The user 230 and associated communication device 228 can be in a first remote location (REM. LOC. 1) 242 outside of the vehicle 204, and the user 234 and associated communication device 232 can be in a second remote location (REM. LOC. 2) 244 outside of the vehicle 204. The user 230 and/or the user 234 can be users who are waiting to be picked up by the vehicle, users who are attempting to schedule a request to be picked up by the vehicle, or users (e.g., parent) who are associated with one or more of the users 218, 222, and/or 226 (e.g., child(ren)) who are inside of the vehicle.

The communication devices 216, 220, 224, 228, and 232 can respectively comprise control components 246, 248, 250, 252, and 254. A control component (CONTROL COMP.) (e.g., 246, 248, 250, 252, or 254) of a communication device (e.g., 216, 220, 224, 228, or 232) can be employed to facilitate controlling (e.g., sharing control) of the various functions associated with the vehicle 204, in accordance with the defined control criteria, and the access and control rights granted to the communication device (e.g., 216, 220, 224, 228, or 232) and/or associated user (e.g., 218, 222, 226, 230, or 234). In some implementations, a communication device can download, via the communication network 210, an application (e.g., a vehicle shared control application) that can include the control component. In other implementations, the communication device can access, via the communication network 210, a web site that can present or provide the control component to the communication device.

In some implementations, the respective communication devices (e.g., 216, 220, 224, 228, 232) and associated users (e.g., 218, 222, 226, 230, 234) can be associated with respective vehicle subscriptions for respective vehicle subscription services. The respective vehicle subscriptions can be associated with respective subsets of access and control rights with regard to controlling (e.g., sharing control of) functions associated with the vehicle 204.

With regard to each user who desires to use the vehicle subscription service for himself/herself or for another associated user (e.g., child, spouse) on the account (e.g., sub-account), a user (e.g., 230) associated with a communication device (e.g., 228) can use the communication device to log in to an account (e.g., main account or sub-account) relating to the vehicle subscription service associated with the user by contacting and communicating with the vehicle control system 202 or a central service component 256, via the communication network 210. The central service component 256 and/or vehicle control system 202 can maintain information (e.g., account and subscription information, user profile comprising authentication information and user preferences, . . . ) regarding the respective accounts and respective vehicle subscriptions of respective users, can manage the authentication of users attempting to access accounts and gain access and control rights, and/or can manage the granting of respective subsets of access and control rights to the respective users and associated communication devices. The central service component 256 and/or vehicle control system 202 can authenticate the user (e.g., 230) and associated communication device (e.g., 228) based at least in part on the authentication information received from the communication device (e.g., by comparing the received authentication information with stored authentication information in the user profile to determine whether they match).

In response to authenticating the user and associated device, the central service component 256 and/or vehicle control system 202 can grant the user and associated communication device a subset of access and control rights with regard to controlling (e.g., sharing control of) functions associated with the vehicle. The central service component 256 and/or vehicle control system 202 also can analyze user preferences associated with the user, wherein the user preferences can act as initial commands or requests with regard to control of certain functions associated with the vehicle 204, in accordance with the subset of access and control rights granted to the user. With regard to any information (e.g., granting of access and control rights, identification of the user and associated communication device, user preferences of the user, . . . ) relating to the user, as determined by the central service component 256, the central service component 256 can communicate such information to the vehicle control system 202 to enable the vehicle control system 202 to schedule the pick up of the user or associated user, make modifications to the functions associated with the vehicle based at least in part on the commands, requests, or user preferences of the user (or associated user), etc. For example, with regard to user preferences relating to function control in a user profile of a user, when the user has been picked up by the vehicle 204 (and has been authenticated), the vehicle control system 202 can control (e.g., automatically control or modify) one or more functions associated with the vehicle 204, based at least in part the user preferences relating to function control contained in the user profile of the user.

While inside the vehicle, the communication device (e.g., 216) of a user (e.g., 218) can be connected to the micro communication network 214 associated with the vehicle 204. The user (e.g., 218) can use the associated communication device (e.g., 216) to control certain functions associated with the vehicle 204, in accordance with the subset of access and control rights granted to the user and associated communication device, and/or can use the communication device to make phone calls, send messages, use applications on or associated with the communication device, and/or access content via the Internet, etc.

For example, if the user (e.g., 218) has control rights that allow the user to control functions related to driving of the vehicle 204, and if the user desires to adjust (e.g., increase or decrease) the speed of the vehicle 204, the user can use the communication device (e.g., 216) (and a vehicle services or control application on or associated with the communication device) to generate a control request to control the accelerator function of the vehicle to adjust the speed of the vehicle 204 to a desired rate of speed. The communication device (e.g., 216) can transmit the control request to the vehicle control system 202 via the micro communication network 214.

The function manager component 206 of the vehicle control system 202 can receive the control request. The function manager component 206 can analyze information in the control request to identify the user making the control request, identify the communication device from which the control request was received, identify the function (e.g., accelerator function) the user desires to control, the control action (e.g., adjust vehicle speed and the amount of adjustment) desired by the user, and/or other pertinent details of the control request. The function manager component 206 can analyze the subset of access and control rights granted to the user (e.g., 218) and associated communication device (e.g., 216) to determine whether the user has a control right to control the accelerator function. In response to determining that the user has the control right to control the accelerator function, and in response to determining that the desired adjustment to the speed of the vehicle 204 does not conflict with an applicable law, conflict with a control right or user preference of another user (e.g., user 222, or user 234), or conflict with the defined control criteria, the function manager component 206 can adjust the speed of the vehicle 204, in accordance with the control request received from the user (e.g., 218). While this example relates to controlling the accelerator function of the vehicle 204, in accordance with various aspects, when in accordance with the subset of access and control rights of the user and communication device and the defined control criteria, the user can use the communication device to control other functions relating to operation of the vehicle 204, such as, for example, braking of the vehicle 204, steering the vehicle 204, shifting of gears of the vehicle 204, setting cruise control for the vehicle 204, starting or turning off the vehicle 204, etc.

As another example, if the user (e.g., 218) has control rights that allow the user to control functions related to the navigation system of the vehicle 204, including modifying the navigation of the vehicle, and if the user desires to change the destination or the travel route the vehicle 204 is to take, the user can use the communication device (e.g., 216) (and a vehicle services or control application on or associated with the communication device) to generate a control request to control a navigation function of the vehicle 204 to modify the destination or travel route of the vehicle 204. The communication device (e.g., 216) can transmit the control request to the vehicle control system 202 via the micro communication network 214.

The function manager component 206 of the vehicle control system 202 can receive the control request. The function manager component 206 can analyze information in the control request to identify the user and communication device, identify the function (e.g., navigation function) the user desires to control, the control action (e.g., modify the destination at which to drop off the user or modify the travel route of the vehicle 204) desired by the user, and/or other pertinent details of the control request. The function manager component 206 can analyze the subset of access and control rights granted to the user (e.g., 218) and associated communication device (e.g., 216) to determine whether the user has a control right to control the navigation function. In response to determining that the user has the control right to control the navigation function, and in response to determining that the desired navigation modification does not conflict with an applicable law, conflict with a control right or user preference of another user (e.g., user 222, or user 234), or conflict with the defined control criteria, the function manager component 206 can modify the destination at which to drop off the user or modify the travel route of the vehicle 204 to the destination or alternate destination, in accordance with the control request received from the user (e.g., 218). While this example relates to controlling the navigation function associated with the navigation system of the vehicle 204, in accordance with various aspects, when in accordance with the subset of access and control rights of the user and communication device and the defined control criteria, the user can use the communication device to control other functions relating to navigation associated with the vehicle 204, such as, for example, monitoring the current location of the vehicle 204, monitoring the distance or amount of travel time remaining until the vehicle 204 reaches the destination, sending or storing waypoints to or in the navigation system, etc.

As still another example, if the user (e.g., 218) has control rights that allow the user to control functions related to the climate control system of the vehicle 204, including modifying the climate controls to modify the climate conditions in the vehicle 204, or portion (area where user's seat is located) thereof, and if the user desires to change a climate control (e.g., temperature control, air conditioning control, or fan control), the user can use the communication device (e.g., 216) (and a vehicle services or control application on or associated with the communication device) to generate a control request to control a climate control function of the climate control system of the vehicle 204 to modify the climate control. The communication device (e.g., 216) can transmit the control request to the vehicle control system 202 via the micro communication network 214.

The function manager component 206 of the vehicle control system 202 can receive the control request. The function manager component 206 can analyze information in the control request to identify the user and communication device, identify the function (e.g., climate control function) the user desires to control, the control action (e.g., modify the climate control function to modify climate conditions in the vehicle 204, or portion (area where user's seat is located) thereof) desired by the user, and/or other pertinent details of the control request. The function manager component 206 can analyze the subset of access and control rights granted to the user (e.g., 218) and associated communication device (e.g., 216) to determine whether the user has a control right to control the climate control function. In response to determining that the user has the control right to control the climate control function, and in response to determining that the desired modification to the climate control does not conflict with an applicable law, conflict with a control right or user preference of another user (e.g., user 222, or user 234), or conflict with the defined control criteria, the function manager component 206 can modify the climate control (e.g., temperature control, air conditioning control, fan control) to modify (e.g., turn on or off, increase or decrease) the climate conditions (e.g., temperature, air conditioning, fan speed level) in the vehicle 204, or portion thereof, in accordance with the control request received from the user (e.g., 218). Although this example relates to controlling a climate control function associated with the climate control system of the vehicle 204, in accordance with various aspects, when in accordance with the subset of access and control rights of the user and communication device and the defined control criteria, the user can use the communication device to control other functions relating to climate control of climate conditions of the vehicle 204, such as, for example, monitoring climate conditions in the vehicle 204, opening or closing of air vents of the vehicle 204, etc.

As yet another example, if the user (e.g., 218) has control rights that allow the user to control functions related to the media system of the vehicle 204, including modifying the media system controls to modify presentation of media content in the vehicle 204, or portion (area in proximity to where user's seat is located) thereof, and if the user desires to change a media system control (e.g., volume control, channel control, media source selection control), the user can use the communication device (e.g., 216) (and a vehicle services or control application on or associated with the communication device) to generate a control request to control a media system function of the media system of the vehicle 204 to modify the media system control. The communication device (e.g., 216) can transmit the control request to the vehicle control system 202 via the micro communication network 214.

The function manager component 206 of the vehicle control system 202 can receive the control request. The function manager component 206 can analyze information in the control request to identify the user and communication device, identify the function (e.g., media system function) the user desires to control, the control action (e.g., modify the volume control, channel control, or media source selection control of the media system), or portion (area where user's seat is located) thereof desired by the user, and/or other pertinent details of the control request. The function manager component 206 can analyze the subset of access and control rights granted to the user (e.g., 218) and associated communication device (e.g., 216) to determine whether the user has a control right to control the media system function. In response to determining that the user has the control right to control the media system function, and in response to determining that the desired modification to the media system control does not conflict with an applicable law, conflict with a control right or user preference of another user (e.g., user 222, or user 234), or conflict with the defined control criteria, the function manager component 206 can modify the media system control to modify the media system function, in accordance with the control request received from the user (e.g., 218). For instance, depending on the media system control being modified, the function manager component 206 can turn up or turn down the volume of media content being presented to the user via the communication device (e.g., 216) of the user or a presentation component (e.g., a display screen, or portion thereof) of the vehicle 204, can change the channel on a radio or television device of the media system, can change the media source or device from which media content is accessed (e.g., change the media source from the radio to a satellite system that provides media content relating to television programs, movies, and music), etc. Although this example relates to controlling the media system function of the media system of the vehicle 204, in accordance with various aspects, when in accordance with the subset of access and control rights of the user and communication device and the defined control criteria, the user can use the communication device to control other functions relating to the media system of the vehicle 204, such as, for example, sending media content to the media system for presentation on the presentation component (e.g., a display screen, or portion of the display screen, in the vehicle 204, a personal display screen in the vehicle 204 for use by the user), accessing a media application (e.g., YOUTUBE application, HULU application, NETFLIX application, . . . ) to access media content, etc.

As some other examples, the user (e.g., 218) can use an associated communication device (e.g., 216) to control other functions associated with the vehicle 204, in accordance with the subset of access and control rights granted to the user and associated communication device. For instance, the user can use the control component (e.g., 246) of the communication device to raise or lower power windows, lock or unlock power locks, open or close vehicle doors, open or close a hood, open or close a trunk, open, close, or adjust a convertible top, open, close, or adjust a sun roof, open, close, or adjust a moonroof, adjust power mirrors, adjust a rear view mirror, turn lights on or off or adjust lights, adjust power seats, adjust the steering wheel, etc.

In some implementations, one user (e.g., parent), such as remote user 230, can desire to control functions associated with the vehicle 204 in connection with an associated user (e.g., child of the parent), such as user 218, while the associated user 218 is being transported in the vehicle 204. For example, the remote user 230 can desire to control the scheduling of transportation, including making desired changes to the scheduling of transportation, of the user 218 by the vehicle 204, control the media content accessed by the user 218 on the communication device 216 or a presentation component of the media system of the vehicle 204, control navigation (e.g., travel route) of the vehicle 204, control speed (e.g., increase or decrease speed, set maximum speed) of the vehicle 204, etc.

To facilitate controlling functions associated with the vehicle 204 from a remote location outside the vehicle 204, the user 230 can use associated communication device 228 (when the user 230 and communication device 228 have been authenticated by the function manager component 206) to control certain functions associated with the vehicle 204, in accordance with the defined control criteria and the subset of access and control rights granted to the user 230 and associated communication device 228. In certain implementations, the remote user 230 also can use the communication device 228 to monitor (e.g., remotely monitor) the associated user (e.g., 218) while the user 218 is in the vehicle 204 (e.g., via a camera (not shown) in the vehicle 204) and/or monitor the use, by the user 218, of the communication device 216 of user 218 or a presentation component of the vehicle 204 while the user is in the vehicle 204.

For example, the user 230 can use the communication device 228 to monitor what the user 218 is doing (e.g., what application the user 218 is using, what the user 218 is viewing, . . . ) on the communication device 216 to determine whether the user 218 is using the communication device 216 in accordance with the wishes of the remote user 230 (e.g., to determine whether user 218 is doing school work using the communication device 216 and associated presentation component of the vehicle 204, as desired by the remote user 230). To facilitate ensuring that the user 218 uses the communication device 216 and/or associated presentation component of the vehicle 204 for a purpose (e.g., doing school work) desired by the remote user 230, the remote user 230 can use the communication device 228 to control functions associated with the vehicle 204, such as functions relating to the media system of the vehicle 204, to control (e.g., restrict) the use of the communication device 216 of the user 218 and/or associated presentation component, so that the communication device 216 of the user 218 and/or associated presentation component are only able to be used by the user 218 for the purpose desired by the remote user 230, for instance, when in accordance with the defined control criteria and the subset of access and control rights of the remote user 230.

The function manager component 206 can detect conflicts relating to the operation of the vehicle 204, such as, for example, conflicts between control requests to control a particular function or respective functions associated with the vehicle 204, conflicts in the scheduling of picking up or dropping off users by the vehicle, and/or other conflicts associated with operation of the vehicle 204. For example, one user (e.g., 222) may use the associated communication device (e.g., 220) to send a control request or may have a user preference to control a climate condition function to increase the temperature in the vehicle 204 to a specified temperature, while another user (e.g., 226) may use the associated communication device (e.g., 224) to send another control request or may have a user preference to control a climate condition function to maintain the temperature in the vehicle 204 at a temperature that is below the specified temperature requested in the first request. As another example, a first user (e.g., remote user 230) or associated user (e.g., 222) may desire to change travel plans of the associated user (e.g., 222) and use an associated communication device (e.g., 228 or 220) to send a first control request to control a navigation function to modify the navigation of the vehicle 204 to accommodate the change in travel plans (e.g., change in destination for drop off of user 222, or change in time for drop off of user 222 at destination), while a second user (e.g., remote user 234) or associated user (e.g., 226) may use the associated communication device (e.g., 232 or 224) to send a second control request or may have a user preference to have that associated user (e.g., 226) be dropped off at a second destination at a second destination time, wherein the control of the navigation function in the first control request to change the travel plans of user 222 can conflict with the second destination time to drop off the user 226 at the second destination.

The function manager component 206 can resolve or facilitate resolving a conflict relating to the operation of the vehicle 204, for example, based at least in part on respective priority rankings associated with the respective users or respective requests of the respective users, a result of a negotiation between the respective users and the vehicle operator (and/or vehicle control system 202), and/or defined control criteria relating to resolving conflicts associated with the operation of the vehicle 204 (e.g., relating to resolving conflicts between control requests to control the particular function or respective functions associated with the vehicle 204), as more fully described herein.

As disclosed, in some implementations, the vehicle 204 can be operated by a person who can be seated in the driver's seat of the vehicle 204. For example, the driver's seat can be located in location O (e.g., operator location) 258, wherein a user 260 (e.g., driver) can be seated. For example, the user 260 can be a minor child driving the vehicle and user 218 can be a parent, guardian, or other person of authority of or over the minor child. The user 260 also can have an associated communication device 262, which can have a control component 264 installed thereon. If the vehicle 204 is being operated autonomously or semi-autonomously (e.g., by a robotic device and/or the vehicle control system 202), the location O 258 can be used as another seat for a passenger or for another desired use (e.g., a place to set items).

For example, the user 260 can be a minor child who is learning to drive the vehicle 204 and the user 218 can be a parent of the minor child who is teaching the minor child to drive the vehicle 204. The parent may desire to be able to use his or her communication device 216 to control (e.g., when necessary or desired) certain functions (e.g., accelerator function, braking function, steering function, gear function . . . ) associated with the vehicle 204 while the minor child is driving the vehicle 204, just in case the minor child makes a mistake while driving that may potentially cause harm to the users, the vehicle 204, or other people or property, or may be in violation of law (e.g., the minor child is mistakenly driving faster than the speed limit).

As the user 260 is driving the vehicle 204, the user 218 can monitor the driving actions of the user 260 by directly observing the user 260 and the vehicle 204 and/or by using the communication device 216, which can be employed to monitor the driving of the user 260 and receive updates and notifications relating to operation of the vehicle 204 by the user 260 from the function manager component 206. If the user 218 detects a problem with the driving of the vehicle 204 by the user 260, the user 218 can use the control component 246 of the communication device 216 to control one or more functions associated with the vehicle 204 to resolve or alleviate the problem. For instance, the function manager component 206 can detect that the vehicle 204 is traveling at a speed that exceeds the applicable speed limit. The function manager component 206 can communicate information (e.g., as part of monitoring vehicle operation, or as part of a notification regarding excessive vehicle speed) indicating that the vehicle 204 is exceeding the speed limit to the communication device 216 of the user 218.

The control component 246 of the communication device 216 can receive such information from the function manager component 206. In response, the control component 246 can automatically generate a control request to control the accelerator function and/or braking function of the vehicle 204 to reduce the speed of the vehicle 204. Alternatively, the user 218 can use the control component 246 to generate such control request. The control component 246 can send the control request to the vehicle control system 202. In response to receiving the control request, the function manager component 206 can control the accelerator function and/or braking function of the vehicle 204 to reduce the speed of the vehicle 204 to a desired speed (e.g., to a speed that is under the speed limit).

In some implementations, the function manager component 206 can discontinue (e.g., automatically discontinue) allowing a user and associated communication to control functions associated with the vehicle 204 in response to detecting a defined discontinuation event, in accordance with the defined control criteria. The defined discontinuation event can comprise, for example, when a user or associated user on the account being transported by the vehicle 204 has exited the vehicle 204 (e.g., has been dropped off at the desired destination), when a communication device of a user is outside of communication range of the communication network, when the user disconnects the communication device from the communication network (e.g., the micro communication network, the macro communication network), or when a user violates a condition relating to the terms and conditions of service on the user's vehicle service account.

With further regard to the communication network 210, the respective communication devices (e.g., 216, 220, 224, 228, 232) can be associated with (e.g., communicatively connected to) the communication network 210 via a wireless communication connection or a wireline (e.g., wired) communication connection. The respective communication devices (e.g., 216, 220, 224, 228, 232) can operate and communicate in a communication network environment. At various times, a communication device (e.g., 232) can be communicatively connected via a wireless communication connection(s) to one or more radio access networks (RANs) (not shown), which can comprise one or more base stations (not shown) to communicatively connect the communication device (e.g., 232) to the communication network 210 to enable the communication device to communicate with the vehicle control system 202 and/or other communication devices (e.g., 216) associated with (e.g., communicatively connected to) the communication network 210 in the communication network environment. The RANs can comprise, for example, a 3GPP universal mobile telecommunication system (UMTS) terrestrial RAN (UTRAN), an E-UTRAN (e.g., Long Term Evolution (LTE) RAN), a GSM RAN (GRAN), and/or other type of RAN(s) employing another type of communication technology.

The communication network 210 can comprise one or more wireline communication networks and one or more wireless communication networks, wherein the one or more wireless communication networks can be based at least in part on one or more various types of communication technology or protocols, such as, for example, 3G, 4G, 5G, or x generation (xG) network, where x can be virtually any desired integer or real value; Wi-Fi; Gi-Fi; Hi-Fi; etc. The communication network 210 (e.g., a core network, or a network comprising a core network and/or an IP-based network) can facilitate routing voice and data communications between a communication device(s) (e.g., 232) and the vehicle control system 202 and/or other communication devices (e.g., 216) associated with the communication network 210 in the communication network environment. The communication network 210 also can allocate resources to the communication devices (e.g., 232), the vehicle control system 202, the central service component 256, or other communication devices (e.g., 216) in the communication network 210, convert or enforce protocols, establish and enforce quality of service (QOS) for the communication devices, vehicle control system 202, and central service component 256, provide applications or services in the communication network 210, translate signals, and/or perform other desired functions to facilitate system interoperability and communication in the communication network 210 (e.g., wireless portion of the communication network 210 or wireline portion of the communication network 210). The communication network 210 further can comprise desired components, such as routers, nodes (e.g., general packet radio service (GPRS) nodes, such as serving GPRS support node (SGSN), gateway GPRS support node (GGSN)), switches, interfaces, controllers, etc., that can facilitate communication of data between communication devices in the communication network environment.

As a communication device(s) (e.g., 232) is moved through a wireless communication network environment, at various times, the communication device(s) can be connected (e.g., wirelessly connected) to one of a plurality of access points (APs) (e.g., macro or cellular AP, femto AP, pico AP, wi-fi AP, wi-max AP, hotspot (e.g., hotspot 1.x, hotspot 2.x, where x is an integer number; communication device (e.g., UE functioning as a mobile hotspot)) that can operate in the wireless communication network environment. An AP (e.g., base station) can serve a specified coverage area to facilitate communication by the communication device(s), the vehicle control system 202, the central service component 256, or other communication devices in the wireless communication network environment. An AP can serve a respective coverage cell (e.g., macrocell, femtocell, picocell, etc.) that can cover a respective specified area, and the AP can service mobile wireless devices, such as the communication device(s) and the vehicle control system 202, located in the respective area covered by the respective cell, where such coverage can be achieved via a wireless link (e.g., uplink (UL), downlink (DL)). When an attachment attempt is successful, the communication device(s) or the vehicle control system 202 can be served by the AP and incoming voice and data traffic can be paged and routed to the communication device(s) through the AP, and outgoing voice and data traffic from the communication device(s) or vehicle control system 202 can be paged and routed through the AP to other communication devices in the communication network environment. In an aspect, the communication device(s) can be connected and can communicate wirelessly using virtually any desired wireless technology, including, for example, cellular, Wi-Fi, Wi-Max, wireless local area networks (WLAN), etc.

Figure 3:
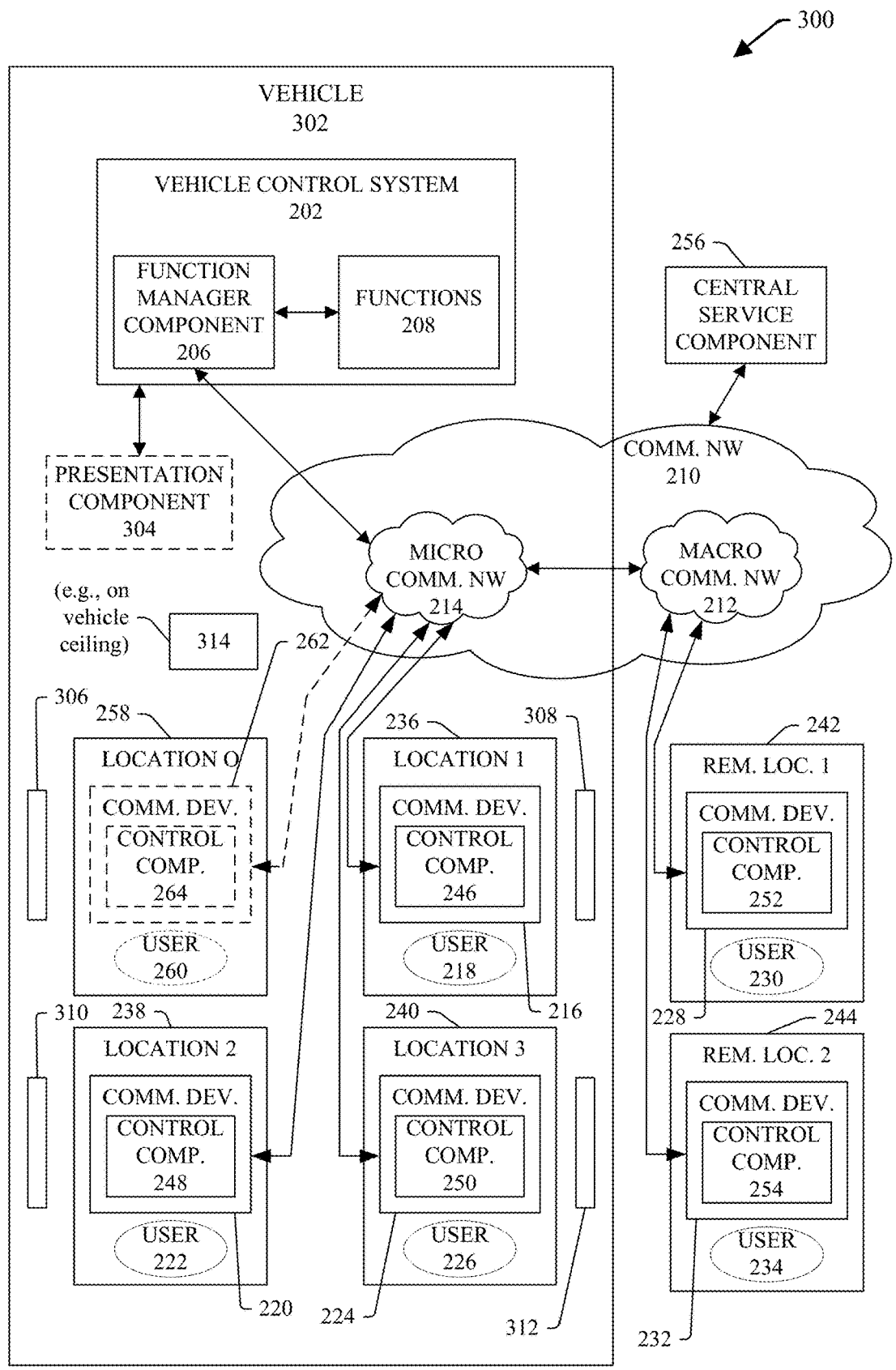
FIG. 3 illustrates a diagram of an example system that can facilitate sharing control of functions associated with a vehicle between an operator of the vehicle and a communication device(s) and associated communication device user(s) and facilitate control of display screens in the vehicle, in accordance with various aspects and embodiments of the disclosed subject matter.

FIG. 3 depicts a block diagram of an example system 300 that can facilitate sharing control of functions associated with a vehicle between an operator of the vehicle and a communication device(s) and associated communication device user(s) and facilitate control of display screens in the vehicle, in accordance with various aspects and embodiments of the disclosed subject matter. The system 300 can comprise a vehicle control system 202 that can control various functions associated with a vehicle 302. The vehicle control system 202, or at least a portion of the vehicle control system 202, can be located inside the vehicle 302. The vehicle control system 202 can comprise the function manager component 206, and can comprise or be associated with functions 208 associated with the vehicle 302. The system 300 also can comprise the communication network 210, including the macro communication network 212 and micro communication network 214.

Various users, including users (e.g., 218, 222, 226, and/or 260) within the vehicle 302 and/or remote users (e.g., 230 and/or 234), can use their respective communication devices (e.g., 216, 220, 224, 228, 232, and/or 262) to facilitate controlling (e.g., sharing control of) various functions 208 associated with the vehicle 302. The respective communication devices (e.g., 216, 220, 224, 228, 232, and/or 262) can comprise respective control components (e.g., 246, 248, 250, 252, 254, and/or 264).

The system 300 can comprise a presentation component 304 that can comprise one or more presentation sub-components (e.g., display screens), such as presentation sub-components 306, 308, 310, 312, and 314, that can be associated with respective surfaces (e.g., windows, ceiling, back surfaces of seats, . . . ) of the vehicle 302. The function manager component 206 and the media system of the vehicle 302 can be associated with the presentation component 304 to facilitate presenting information (e.g., data, applications, media content, online information, . . . ) to respective users (e.g., 218, 222, 226, and/or 260) inside the vehicle 302. Some of the respective presentation sub-components 306, 308, 310, and/or 312) can be located in relative proximity to the respective locations (e.g., 236, 238, 240, and/or 258) where the users (e.g., 218, 222, 226, and/or 260) can be while inside of the vehicle 302.

In some implementations, as desired by all or a controlling portion of users, media content (e.g., movies, television programs, videos) or other data can be presented on the presentation component 304. For example, based at least in part on a majority of users in the vehicle 302 deciding that certain media content or data is to be presented on the presentation component 304 or based at least in part on the respective priority rankings associated with the users, the certain media content or data can be presented on the presentation component 304 (e.g., presented via all of the presentation sub-components 306, 308, 310, 312, and 314), when in accordance with the respective subsets of access and controls rights of the users and the defined control criteria.

In other implementations, respective presentation sub-components (e.g., 306, 308, 310, and/or 312) can be used by respective users (e.g., 218, 222, 226, and/or 260) to view respective media content or other data, wherein the respective users can utilize their respective communication devices (e.g., 216, 220, 224, and/or 262) to facilitate presenting the respective media content or other data via the respective presentation sub-components (e.g., 306, 308, 310, and/or 312). For example, the user 218 can use the associated communication device 216 to facilitate presenting media content on the presentation sub-component 308, which can be located in relatively close proximity to the user 218 inside the vehicle 302, while one or more of the other users (e.g., 222, 226, and/or 260) can be viewing other media content on the other presentation sub-components (e.g., 306, 310, 312, and/or 314).

In certain other implementations, a remote user 230 (e.g., a parent) also can use an associated communication device 228, and control component 252, to control function of the media system and a presentation sub-component (e.g., 308) to control the media content or other data that are presented on the presentation sub-component (e.g., 308) to an associated user 218 (e.g., child of the parent) while the associated user 218 is in the vehicle 302, in accordance with the subset of access and control rights granted to the remote user 230 and associated communication device 228, as more fully described herein.

Figure 4:
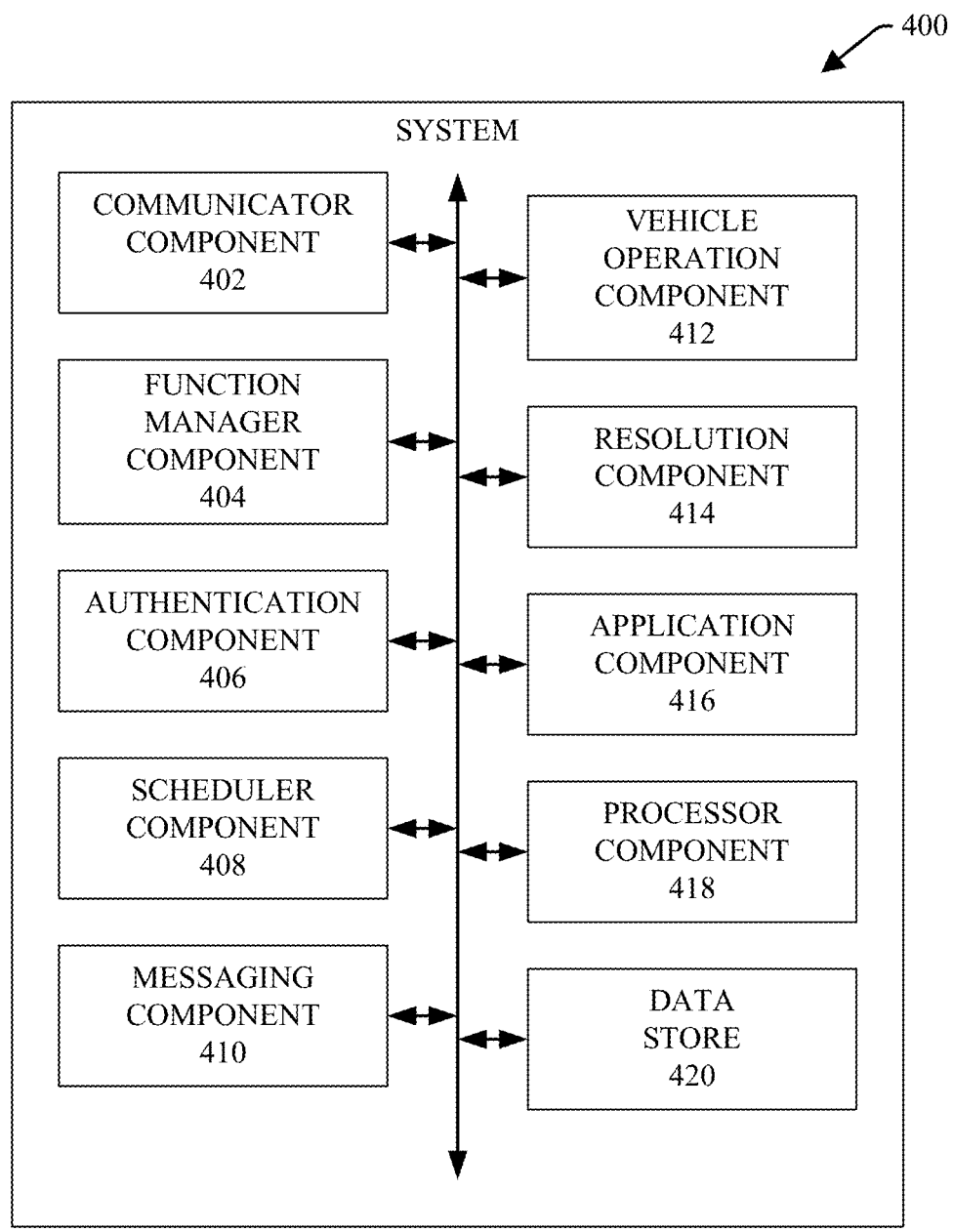
FIG. 4 depicts a block diagram of an example system associated with a vehicle, in accordance with various aspects and embodiments of the disclosed subject matter.

Turning to FIG. 4, depicted is a block diagram of an example system 400 associated with a vehicle, in accordance with various aspects and embodiments of the disclosed subject matter. In some implementations, the example system 400 can be or can comprise a vehicle control system associated with a vehicle. In other implementations, the example system 400 can be or can comprise a central service component associated with a vehicle(s).

The system 400 can comprise, for example, a communicator component 402, a function manager component 404, an authentication component 406, a scheduler component 408, a messaging component 410, a vehicle operation component 412, a resolution component 414, and an application component 416. The communicator component 402 can transmit information from the system 400 to another component(s) or device(s) (e.g., communication devices) and/or can receive information from the other component(s) or device(s). For instance, to facilitate scheduling the transportation of a user from a pick-up point to a destination point, the communicator component 402 can communicate with the communication device of the user or another associated user (e.g., parent of a child user) via a communication network to facilitate obtaining detailed information (e.g., pick-up time and location, destination location, time user has to be at the destination) regarding such transportation of the user. As another example, the communicator component 402 also can receive content from devices associated with content providers, and can communicate such content to a presentation component (e.g., display screen(s) in the vehicle) or communication device associated with the user for presentation by the presentation component or communication device.

The function manager component 404 can control (e.g., manage) operations associated with the system 400. For example, the function manager component 404 can facilitate generating instructions to have components of the system 400 perform operations, and can communicate respective instructions to respective components (e.g., communicator component 402, authentication component 406, scheduler component 408, . . . ) of the system 400 to facilitate performance of operations by the respective components of the system 400 based at least in part on the instructions, in accordance with the defined control criteria and defined control algorithms relating to controlling the functions and operation of the vehicle. The function manager component 404 also can facilitate controlling data flow between the respective components of the system 400 and controlling data flow between the system 400 and another component(s) or device(s) (e.g., communication device, presentation component, content provider device, device of the communication network) associated with (e.g., connected to) the system 400.

The function manager component 404 also can control the functions and operations of the vehicle, and can control the sharing of the controlling of the functions associated with the vehicle with a communication device(s) and associated user(s) that are located inside the vehicle or located outside of the vehicle, such as more fully described herein. For instance, the function manager component 404 can control which functions, and to what extent such functions, can be controlled by a communication device and associated user based at least in part on a subset of access and control rights that can be granted to the communication device and associated user (e.g., by the function manager component 404), in accordance with the defined control criteria and/or a vehicle service subscription associated with the user. In some implementations, all or a desired portion of the other components (e.g., communicator component 402, authentication component 406, scheduler component 408, messaging component 410, vehicle operation component 412, resolution component 414, application component 416, . . . ) of the system 400 can be part of the function manager component 404.

The authentication component 406 can employ authentication protocols to facilitate security and integrity of the vehicle, including operation of the vehicle and functions associated with the vehicle, users inside or associated with the vehicle, data associated with the vehicle (e.g., communicated data, data stored in a data store), in accordance with the disclosed subject matter. For example, the authentication component 406 can solicit authentication data (e.g., an authentication credential) from an entity (e.g., a user, another device), and, upon receiving the authentication data so solicited, can be employed, individually and/or in conjunction with information acquired and ascertained as a result of biometric modalities employed, to facilitate control access to the vehicle, access and control of certain functions associated with the vehicle, access to data associated with the vehicle, etc. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by the authentication component 406. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component 406 can implement one or more machine-implemented techniques to identify an entity (e.g., user, communication device) by its unique physical and behavioral characteristics and attributes. Biometric modalities that can be employed can include, for example, finger print identification that can scan the corrugated ridges of skin that are non-continuous and form a pattern that can provide distinguishing features to identify an entity, face recognition wherein measurements of key points on an entity's face can provide a unique pattern that can be associated with the entity, and iris recognition that measures from the outer edge towards the pupil the patterns associated with the colored part of the eye—the iris—to detect unique features associated with an entity's iris.

In response to verifying that the received authentication data matches stored authentication data relating to the entity, the authentication component 406 can grant a subset of access and control rights to allow the entity (e.g., user and associated communication device) access to the vehicle, access and control of certain functions associated with the vehicle, and/or access to data associated with the vehicle, etc., in accordance with access and control rights that the entity is permitted to have. In response to not being able to verify that the received authentication data matches stored authentication data relating to the entity, the authentication component 406 can deny the entity access and control rights to access to the vehicle, access and control of certain functions associated with the vehicle, and/or access to data associated with the vehicle, etc., or can grant limited access and control rights to the entity, wherein the limited access rights can be access and control rights that are permitted to be granted to non- or un-authorized entities. The authentication component 406 also can provide an entity with one or more additional opportunities to provide valid authentication data up to a defined maximum number of authentication attempts.

The scheduler component 408 can be employed to efficiently schedule the picking up of users by the vehicle at respective locations and the dropping off of users at respective destination locations. The scheduler component 408 also can modify a schedule for the picking up and dropping off users by the vehicle, in response to changed conditions (e.g., a change in travel plans of a user). The scheduler component 408 also can facilitate arranging the order of picking up and dropping of users by the vehicle, for example, in accordance with respective priorities associated with respective users and/or respective vehicle service subscriptions associated with the users.

The messaging component 410 can facilitate receiving messages from a communication device associated with a user or other component or device, and sending messages from the system 400 to the communication device or other component or device. The messages can be, for example text messages, instant messages, multimedia messages, or emails. For example, the messaging component 410 can receive a message from a communication device of a user, wherein the message can comprise a schedule request to have the user (or an associated user on the account) picked up at a particular location at a desired time and/or dropped off at a destination at a desired time, or to modify a previous schedule request. As another example, the messaging component 410 can receive a message from the communication device of a user, wherein the message can comprise a control request to control a certain function associated with the vehicle. As still another example, the messaging component 410 can communicate a message (e.g., a notification) to a communication device of a user to notify the user that a control request was executed or denied, to notify the user of a schedule change in the picking up or dropping off of the user or an associated user by the vehicle, or to notify the user that an associated user (e.g., child of the user) has been picked up or dropped off by the vehicle, etc.

The vehicle operation component 412 can facilitate controlling operations and functions of the vehicle, including, for example, operations and functions relating to movement and navigation of the vehicle, climate controls of the vehicle, navigation system controls of the vehicle, and/or media system controls of the vehicle. The vehicle operation component 412 can comprise or be associated with the functions and systems of the vehicle. For example, the vehicle operation component 412 can comprise or be associated with the navigation system, the climate control system, the media system, the accelerator, the brakes, the ignition, steering mechanisms, cruise control mechanism, lights, locks, window controls, roof controls, etc., associated with the vehicle.

The resolution component 414 can detect conflicts relating to the operation of the vehicle, such as, for example, conflicts between control requests to control a function associated with the vehicle, conflicts in the scheduling of picking up or dropping off users by the vehicle, and/or other conflicts. The resolution component 414 can resolve or facilitate resolving a conflict relating to the operation of the vehicle, for example, based at least in part on respective priority rankings associated with the respective users or respective requests of the respective users, a result of a negotiation between the respective users and the vehicle operator (and/or vehicle control system), and/or defined control criteria relating to resolving conflicts associated with the operation of the vehicle (e.g., relating to resolving conflicts between control requests to control a function associated with the vehicle).

The application component 416 can be employed to generate, provide, and/or enable use of one or more applications (e.g., a vehicle service application, a content provider application, . . . ) that can be used by a communication device (e.g., mobile phone, electronic pad or tablet, computer, . . . ) to facilitate utilizing services associated with a vehicle(s). For instance, a user can use a communication device to download an application from the application component 416 to the communication device or can otherwise obtain and/or access the application (directly or indirectly) from the application component 416. The application can operate in conjunction with the system 400 to facilitate enabling the user to utilize the vehicle services.

As an example, the user can use the application associated with the communication device to facilitate scheduling transportation of the user or an associated user on the account (via the scheduler component 408), generating and communicating control requests to the vehicle control system to control a function associated with the vehicle, monitoring travel of the vehicle (e.g., speed of the vehicle, location of the vehicle, distance remaining until destination is reached) or conditions associated with the vehicle (e.g., temperature inside the vehicle), and/or accessing media or controlling presentation of the media, etc. As another example, the application component 416 can generate, provide, and/or enable use of a content provider application (e.g., PANDORA application, YOUTUBE application, HULU application, NETFLIX application, . . . ) that can facilitate providing content from a content provider (e.g., a server device of the content provider) to the communication device of the user or to a presentation component (e.g., a display screen space associated with the user) in the vehicle for presentation of the content via the communication device or the presentation component.

The system 400 can comprise a processor component 418 that can work in conjunction with the other components (e.g., communicator component 402, function manager component 404, authentication component 406, scheduler component 408, messaging component 410, vehicle operation component 412, resolution component 414, application component 416, data store 420) to facilitate performing the various functions of the system 400. The processor component 418 can employ one or more processors, microprocessors, or controllers that can process data, such as information relating to users, user preferences, access and controls rights relating to controlling functions associated with the vehicle, scheduling transportation of users by the vehicle, controlling functions associated with the vehicle, vehicle movement and navigation, climate control associated with the vehicle, accessing and presentation of media content, detecting and/or resolving a conflicts associated with the vehicle, the communication network, authentication of users and communication devices, traffic flows, policies, defined control criteria, algorithms (e.g., defined control algorithm), protocols, interfaces, tools, and/or other information, to facilitate operation of the system 400, as more fully disclosed herein, and control data flow between the system 400 and other components (e.g., communication devices, presentation component, content provider devices, devices of the communication network, data sources, applications) associated with the system 400.

The system 400 also can include a data store 420 that can store data structures (e.g., user data, metadata), code structure(s) (e.g., modules, objects, hashes, classes, procedures) or instructions, information relating to users, user preferences, access and controls rights relating to controlling functions associated with the vehicle, scheduling transportation of users by the vehicle, controlling functions associated with the vehicle, vehicle movement and navigation, climate control associated with the vehicle, accessing and presentation of media content, detecting and/or resolving a conflicts associated with the vehicle, the communication network, authentication of users and communication devices, traffic flows, policies, defined control criteria, algorithms (e.g., defined control algorithm), protocols, interfaces, tools, and/or other information, to facilitate controlling operations associated with the system 400. In an aspect, the processor component 418 can be functionally coupled (e.g., through a memory bus) to the data store 420 in order to store and retrieve information desired to operate and/or confer functionality, at least in part, to the communicator component 402, function manager component 404, authentication component 406, scheduler component 408, messaging component 410, vehicle operation component 412, resolution component 414, application component 416, data store 420, etc., and/or substantially any other operational aspects of the system 400.

Figure 5:
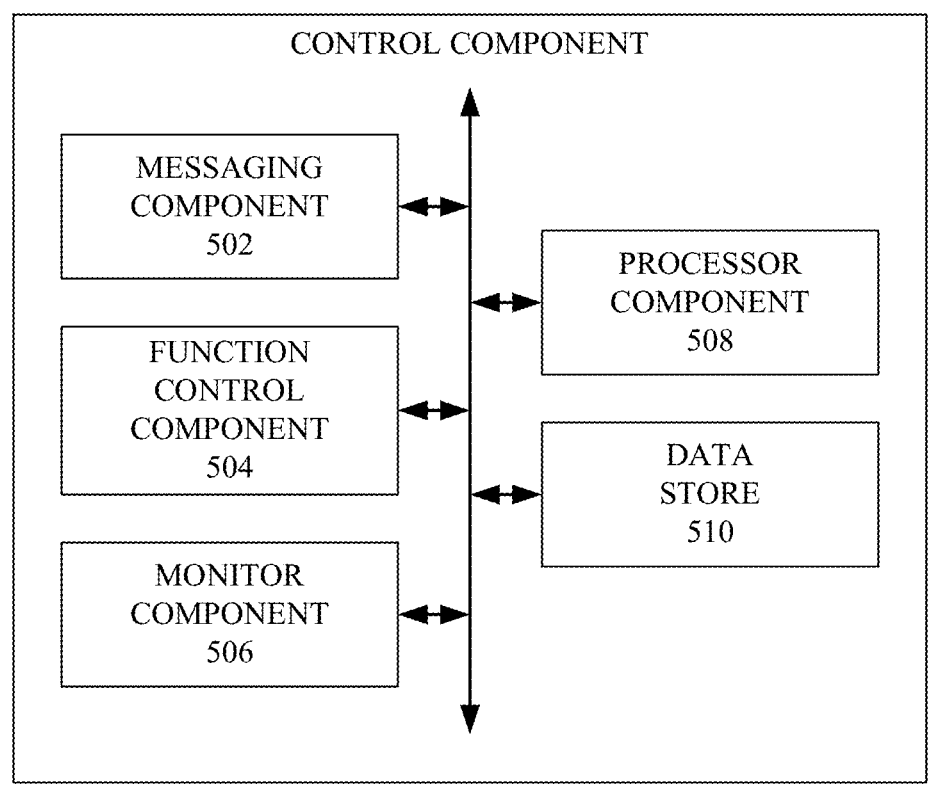
FIG. 5 illustrates a block diagram of an example control component, in accordance with various aspects and embodiments of the disclosed subject matter.

FIG. 5 illustrates a block diagram of an example control component 500, in accordance with various aspects and embodiments of the disclosed subject matter. A communication device of a user can comprise the control component 500 to facilitate controlling (e.g., sharing control of) functions associated with a vehicle, in accordance with various aspects and embodiments of the disclosed subject matter.

The control component 500 can comprise a monitor component 502 that can monitor conditions or controls associated with the vehicle. For instance, the monitor component 502 can monitor a status of a function or control associated with the vehicle, speed of the vehicle, location of the vehicle, navigation (e.g., scheduled travel route) of the vehicle, scheduling of the picking up or dropping off of the user or an associated user on the account (e.g., vehicle services account), climate conditions or controls associated with the vehicle, content being presented or available to be accessed by the media system, and/or control requests related to controlling a function associated with the vehicle, etc. Information derived from monitoring the conditions or controls associated with the vehicle can be presented to the user via the communication device (e.g., a display screen of the communication device).

The control component 500 can comprise a function control component 504 that can be employed to facilitate controlling functions associated with the vehicle, in accordance with the defined control criteria. The function control component 504 can present buttons or controls relating to the functions, via the communication device, to the user. The user can manipulate the buttons or controls to facilitate generating control requests and sending the control requests to the vehicle control system. The buttons or controls can relate to functions involving, for example, movement and navigation of the vehicle, climate control associated with the vehicle, control of access or presentation of media content by the media system, and/or other features or components (e.g., door locks, window controls, seat controls, roof controls, . . . ) of the vehicle.

The buttons or controls also can relate to parental controls that a parent can use to control functions associated with the vehicle in connection with a child of the parent being transported in the vehicle. For example, the parent can use the buttons or controls of the function control component 504 to set restrictions on the media content that the child is able to access via the media system of the vehicle, set restrictions on what the child is able to view on a presentation component (e.g., display screen space) of the vehicle or the communication device of the child (e.g., when the communication device is connected to the micro communication network of the vehicle), and/or set restrictions on the controlling of functions associated with the vehicle by the child.

The control component 500 also can include a messaging component 506 that can facilitate receiving messages from the vehicle control system of the vehicle, the central service component, and/or another component or device, and sending messages from the control component 500 to the vehicle control system, central service component, and/or other component or device. The messages can be, for example text messages, instant messages, multimedia messages, or emails. For example, the messaging component 506 can generate a message and send the message from the communication device of the user to the vehicle control system, wherein the message can comprise user preferences relating controlling functions associated with the vehicle, can comprise a schedule request to have the user (or an associated user on the account) picked up at a particular location at a desired time and/or dropped off at a destination at a desired time, or can comprise a request to modify a previous schedule request. As another example, the messaging component 506 can generate a message and send the message from the communication device to the vehicle control system, wherein the message can comprise a control request to control a certain function associated with the vehicle. As still another example, the messaging component 506 can receive a message (e.g., a notification) from the vehicle control system to notify the user that a control request was executed or denied, to notify the user of a schedule change in the picking up or dropping off of the user or an associated user by the vehicle, or to notify the user that an associated user (e.g., child of the user) has been picked up or dropped off by the vehicle, etc.

The control component 500 can comprise a processor component 508 that can work in conjunction with the other components (e.g., monitor component 502, function control component 504, messaging component 506, data store 510) to facilitate performing the various operations and functions of the control component 500. The processor component 508 can employ one or more processors, microprocessors, or controllers that can process data, such as information relating to users, user preferences of the user, access and controls rights relating to controlling functions associated with the vehicle, monitoring conditions or controls associated with the vehicle, scheduling transportation of the user or an associated user on the account by the vehicle, control requests, controlling functions associated with the vehicle, vehicle movement and navigation, climate control associated with the vehicle, accessing and presentation of media content, the communication network, authentication of users and communication devices, traffic flows, policies, algorithms (e.g., defined control algorithm), defined control criteria, protocols, interfaces, tools, and/or other information, to facilitate operation of the control component 500, as more fully disclosed herein, and control data flow between the control component 500 and other components (e.g., vehicle control system, central service component, communication devices, presentation component, content provider devices, devices of the communication network, data sources, applications) associated with the control component 500.

The control component 500 also can include a data store 510 that can store data structures (e.g., user data, metadata), code structure(s) (e.g., modules, objects, hashes, classes, procedures) or instructions, information relating to users, user preferences of the user, access and controls rights relating to controlling functions associated with the vehicle, monitoring conditions or controls associated with the vehicle, scheduling transportation of the user or an associated user on the account by the vehicle, control requests, controlling functions associated with the vehicle, vehicle movement and navigation, climate control associated with the vehicle, accessing and presentation of media content, the communication network, authentication of users and communication devices, traffic flows, policies, algorithms (e.g., defined control algorithm), defined control criteria, protocols, interfaces, tools, and/or other information, to facilitate controlling operations associated with the control component 500. In an aspect, the processor component 508 can be functionally coupled (e.g., through a memory bus) to the data store 510 in order to store and retrieve information desired to operate and/or confer functionality, at least in part, to the monitor component 502, function control component 504, messaging component 506, data store 510, etc., and/or substantially any other operational aspects of the control component 500.

It is also to be understood and appreciated that cryptographic protocols can be employed to facilitate security of data associated with a memory (e.g., data store) in accordance with the disclosed subject matter. For example, a cryptographic component (e.g., cryptographic engine) can be employed and can facilitate encrypting and/or decrypting data (e.g., content, content schedule, user-related information) to facilitate securing data being written to, stored in, and/or read from memory (e.g., data store). The cryptographic component can provide symmetric cryptographic tools and accelerators (e.g., Twofish, Blowfish, AES, TDES, IDEA, CASTS, RC4, etc.) to ensure that the memory, or at least a specified partition in the memory component, or portions thereof, can only be accessed by those entities authorized and/or authenticated to do so. The cryptographic component can also provide asymmetric cryptographic accelerators and tools (e.g., RSA, Digital Signature Standard (DSS), and the like) to ensure that a specified partition in a memory, or portions thereof, only can be accessed by those entities that are authorized and certified to do so. Additionally, the cryptographic component can provide accelerators and tools (e.g., Secure Hash Algorithm (SHA) and its variants such as, for example, SHA-0, SHA-1, SHA-224, SHA-256, SHA-384, and SHA-512) to ensure that access to the specified partition in the memory is confined to those entities authorized to gain access.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 6:
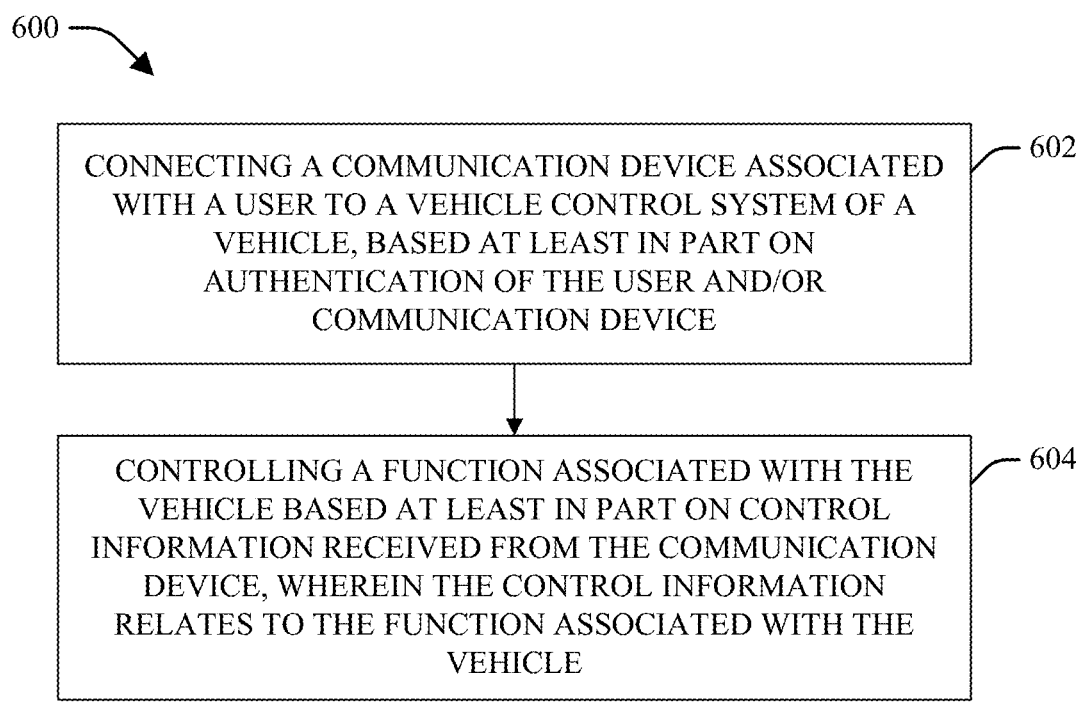
FIG. 6 illustrates a flow diagram of an example method that can facilitate sharing control of functions associated with a vehicle between an operator of the vehicle and a communication device(s) and associated communication device user(s), in accordance with various aspects and embodiments of the disclosed subject matter.
Figure 7:
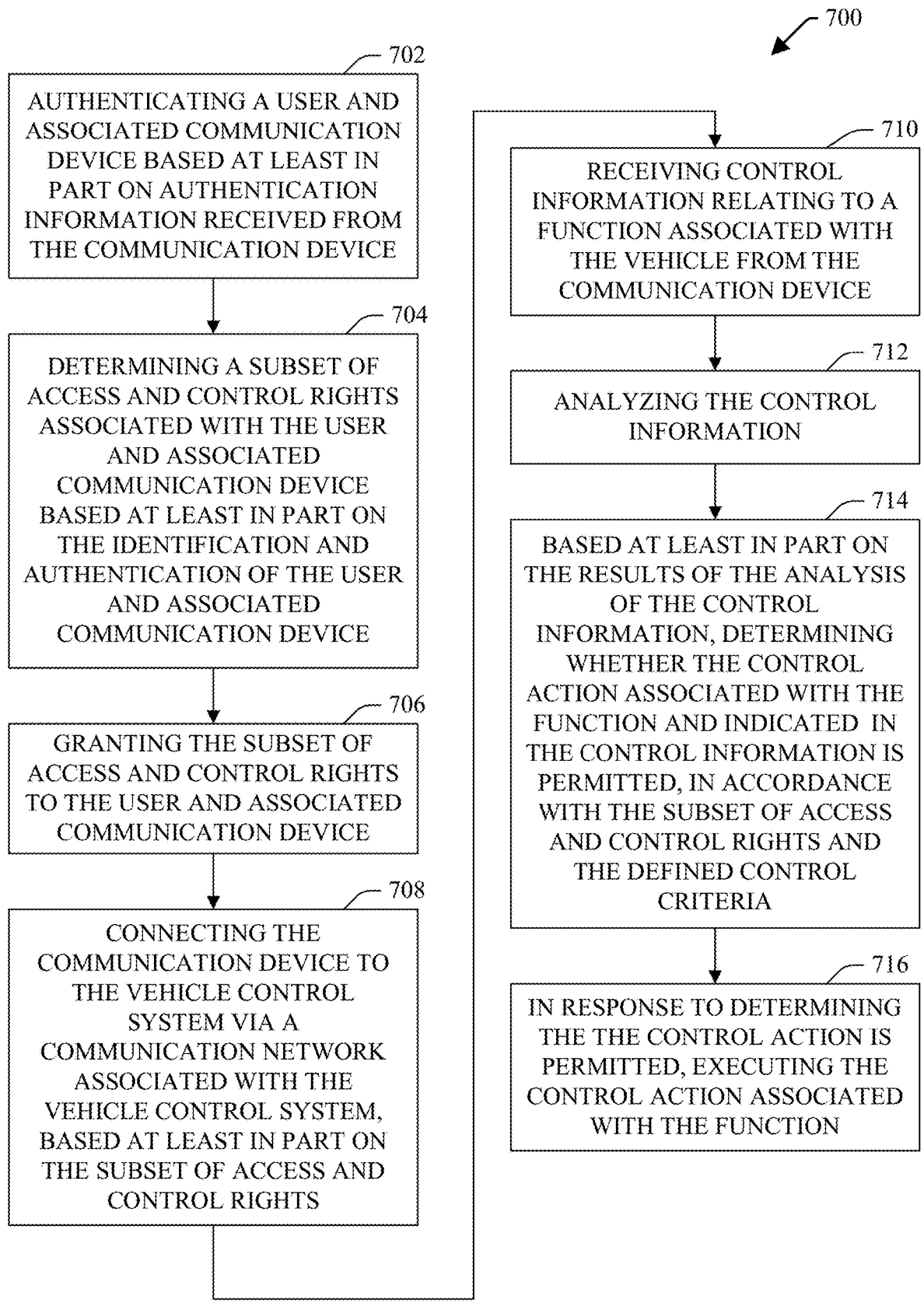
FIG. 7 presents a flow chart of another example method that can facilitate sharing control of functions associated with a vehicle between an operator of the vehicle and a communication device(s) and associated communication device user(s), in accordance with various aspects and embodiments of the disclosed subject matter.
Figure 8:
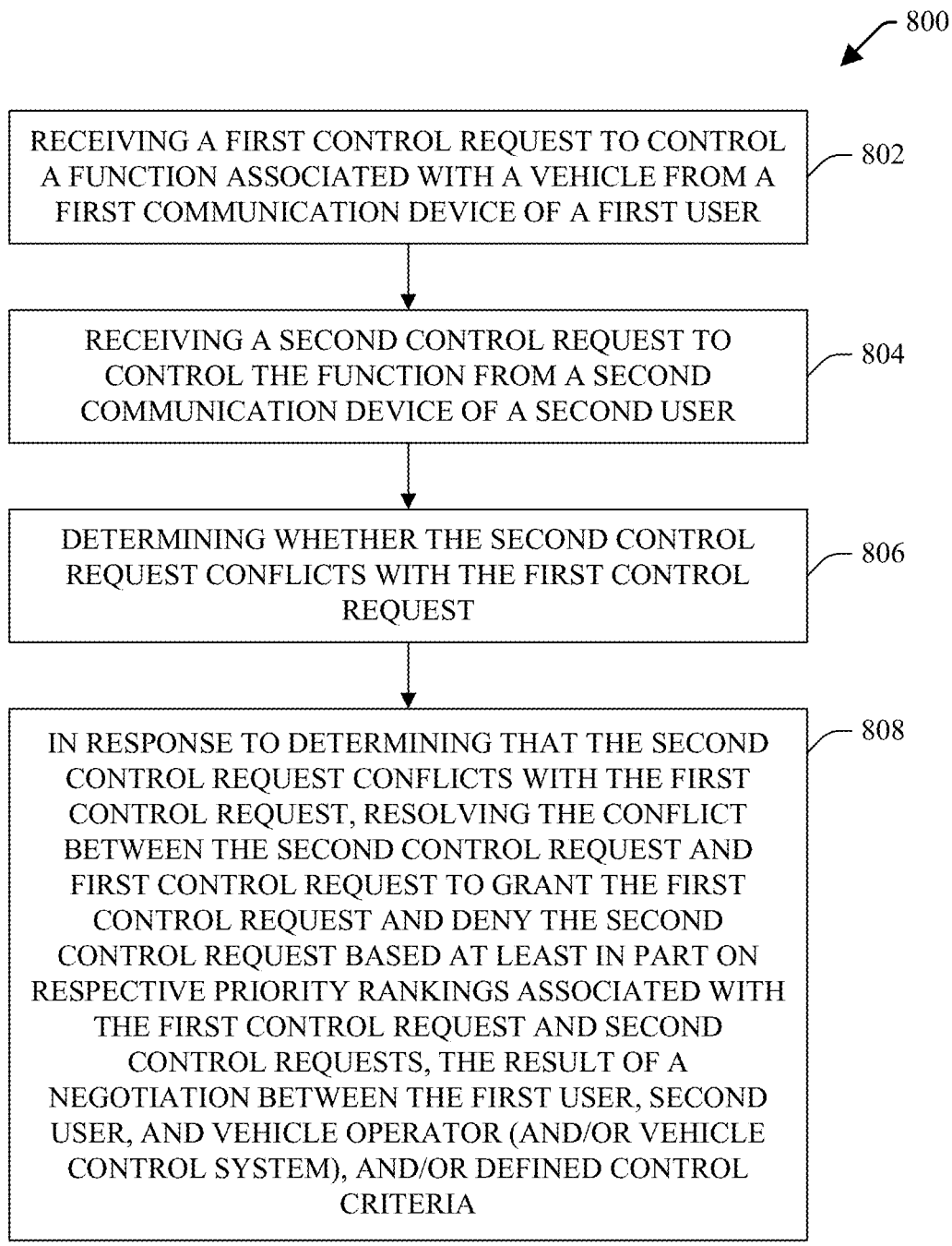
FIG. 8 presents a flow chart of another example method that can facilitate resolving a conflict in connection with sharing control of functions associated with a vehicle between an operator of the vehicle and communication devices and associated communication device users, in accordance with various aspects and embodiments of the disclosed subject matter.

In view of the example systems and/or devices described herein, example methods that can be implemented in accordance with the disclosed subject matter can be further appreciated with reference to flowcharts in FIGS. 6-8. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 6 illustrates a flow chart of an example method 600 that can facilitate sharing control of functions associated with a vehicle between an operator of the vehicle and a communication device(s) and associated communication device user(s), in accordance with various aspects and embodiments of the disclosed subject matter. The method 600 can be employed by, for example, a vehicle control system, comprising a function manager component, and/or a central service component.

At 602, a communication device associated with a user can be connected to a vehicle control system (e.g. a device of the vehicle control system) of a vehicle, based at least in part on authentication of the user and/or communication device by the vehicle control system or a central service component associated with the vehicle control system. The vehicle control system and/or central service component can authenticate the communication device and/or user based at least in part on authentication information (e.g., phone number or other device identifier associated with the communication device, username or password, biometric information associated with the user, . . . ) received from the communication device or user. In response to the authentication of the user and the communication device, the vehicle control system can connect the communication to the vehicle control system and can grant the communication device and user a subset of access and control rights to control certain functions, including the function, of the vehicle, in accordance with the defined control criteria.

If the communication device is located inside the vehicle, the communication device can be connected to a micro communication network (e.g., Wi-Fi network, Gi-Fi network, Hi-Fi network, BLUETOOTH network) associated with the vehicle and the vehicle control system via the micro communication network. If the communication device is located remote from (e.g., outside of) the vehicle, the communication device can be connected to a communication network, comprising a macro communication network, and to the vehicle control system via the macro communication network.

The vehicle control system or central service component can determine a subset of access and control rights that are to be granted to the user and associated communication device, in accordance with the defined control criteria, wherein the subset of access and control rights relate to the rights the user and associated communication device have to control (e.g., share control of) a subset of functions associated with the vehicle. In some implementations, the subset of access and control rights can be determined based at least in part on a level of service the user has with regard to a subscription for a vehicle service associated with the vehicle. The connecting of the communication device to the vehicle control system can facilitate sharing, with the communication device, control of a subset of functions associated with the vehicle based at least in part on the subset of access and control rights granted to the user and associated communication device.

At 604, a function associated with the vehicle can be controlled based at least in part on control information received from the communication device, wherein the control information relates to the function associated with the vehicle. The vehicle control system can receive the control information from the communication device. The function can relate to, for example, vehicle operation (e.g., speed, braking, steering, . . . ), a navigation system of the vehicle, a climate control system of the vehicle, a media system of the vehicle, or other functions or controls (e.g., vehicle lights, seat controls, sunroof, convertible roof, . . . ) of the vehicle. The control information can be received as part of a control request or control command, or alternatively, as part of a user preference (e.g., stored in a user profile) of the user with regard to the function.

The vehicle control system (e.g., the function manager component of the vehicle control system) can analyze the control information and identify the function the user desires to control. The vehicle control system can analyze the control action the user desires to be taken (e.g., executed) with regard to the function and the subset of access and control rights granted to the user and associated communication device. In response to determining that the user and/or communication device has a control right to control the function (e.g., to have the control action executed), the vehicle control system can control the function based at least in part on the control information. The controlling of the function can involve, for example, an adjustment (e.g., modification) of a parameter relating to the function.

FIG. 7 presents a flow chart of another example method 700 that can facilitate sharing control of functions associated with a vehicle between an operator of the vehicle and a communication device(s) and associated communication device user(s), in accordance with various aspects and embodiments of the disclosed subject matter. The method 700 can be employed by, for example, a vehicle control system, comprising a function manager component, and/or a central service component.

At 702, a user and associated communication device can be authenticated based at least in part on authentication information received from the communication device. The vehicle control system or central service component can authenticate the user and associated communication device based at least in part on the authentication information received from the communication device by the vehicle control system or central service component. The authentication information can comprise, for example, a phone number and/or device identifier associated with the communication device, a username and/or password of the user, biometric information (e.g., eye or iris characteristics, facial characteristics, fingerprint characteristics) associated with the user, and/or other type of authentication information.

The function manager component or central service component can analyze the received authentication information and can compare it to stored authentication information associated with the user and communication device, wherein the stored authentication information can be stored in and retrieved from a data store of the vehicle control system or the central service component. If, based at least in part on the results of the analysis and comparison, the function manager component or central service component determines that the received authentication information satisfies defined match criteria with respect to (e.g., is a match to) the stored authentication information, the function manager component or central service component can determine that the user and associated communication device are authenticated.

If, however, based at least in part on the results of the analysis and comparison, the function manager component or central service component determines that the received authentication information does not satisfy the defined match criteria with respect to (e.g., is not a match to) the stored authentication information, the function manager component or central service component can determine that the user and associated communication device are not authenticated. The function manager component or central service component may provide a user more than one attempt, up to a defined maximum number of attempts (e.g., failed attempts), to be authenticated, after which the user and communication device can be locked out of further attempts to authenticate for a defined period of time or until an authentication condition (e.g., obtain and use a temporary passcode after providing other or alternate authentication information, otherwise resolve the authentication issue with the vehicle control system or central service component) is satisfied by the user.

At 704, a subset of access and control rights associated with the user and associated communication device can be determined based at least in part on the identification and authentication of the user and associated communication device. The function manager component or central service component can retrieve a user profile, including account information, associated with the user from the data store.

The function manager component or central service component can analyze the information in the user profile to facilitate determining the subset of access and control rights that are to be granted to the user and associated communication device. The account information can relate, for example, to an account or sub-account of the user with regard to a subscription for a vehicle subscription service associated with the vehicle. The account information can indicate the subset of access and control rights the user and associated communication device can have with respect to controlling certain functions associated with the vehicle, which certain functions the user and associated communication device are permitted to control, and/or a level of service and/or a priority ranking the user has with respect to the vehicle subscription service.

At 706, the subset of access and control rights can be granted to the user and associated communication device. In response to determining the subset of access and control rights, the function manager component or central service component can grant the subset of access and control rights to the user and associated communication device.

At 708, the communication device can be connected to the vehicle control system via a communication network associated with the vehicle control system, based at least in part on the subset of access and control rights. The function manager component can connect the communication device to the vehicle control system via the communication network. If the communication device is located inside the vehicle or in proximity to (e.g., within a defined distance of) the vehicle, the communication device can be connected to the vehicle control system via a micro communication network associated with the vehicle. If the communication device is located at a remote location outside of the vehicle, the communication device can be connected to the vehicle control system via a macro communication network associated with the vehicle.

At 710, control information relating to a function associated with the vehicle can be received from the communication device. The vehicle control system can receive the control information from the communication device. The function can relate to, for example, vehicle operation, a navigation system of the vehicle, a climate control system of the vehicle, a media system of the vehicle, or other functions or controls associated with the vehicle. The control information can be received as part of a control request or control command, or alternatively, as part of a user preference (e.g., stored in the user profile) of the user with regard to the function.

At 712, the control information can be analyzed. The function manager component can analyze the control information and the subset of access and control rights to facilitate determining which function associated with the vehicle the user desires to control, what control action the user desires to take with regard to the function, and whether the user and associated communication device have a right, as part of the subset of access and control rights, to have the control action taken with regard to the function associated with the vehicle.

At 714, based at least in part on the results of the analysis of the control information, a determination can be made regarding whether the control action associated with the function and indicated (e.g., specified) in the control information is permitted, in accordance with the subset of access and control rights and the defined control criteria. The function manager component can determine whether the control action associated with the function and indicated (e.g., specified) in the control information is permitted, based at least in part on the results of the analysis of the control information, in accordance with the subset of access and control rights and the defined control criteria.

At 716, in response to determining the control action is permitted, the control action associated with the function can be executed. In response to determining the control action is permitted, the function manager component can execute the control action with respect to the function associated with the vehicle. The control action can be, for example, an adjustment of one or more parameters associated with the function (e.g., setting or adjusting a temperature parameter of the climate control system, setting or adjusting a travel route or waypoint on the navigation system, adjusting a desired speed of the vehicle, . . . ).

FIG. 8 depicts a flow chart of another example method 800 that can facilitate resolving a conflict in connection with sharing control of functions associated with a vehicle between an operator of the vehicle and communication devices and associated communication device users, in accordance with various aspects and embodiments of the disclosed subject matter. The method 800 can be employed by, for example, a vehicle control system, comprising a function manager component, and/or a central service component.

At 802, a first control request to control a function associated with a vehicle can be received from a first communication device of a first user. The vehicle control system can receive the first control request from the first communication device user via a communication network. The first user and first communication device can be located inside the vehicle, and can be connected to the vehicle control system via a micro communication network, or can be located in a remote location outside of the vehicle, and can be connected to the vehicle control system via a macro communication network.

At 804, a second control request to control the function can be received from a second communication device of a second user. The vehicle control system can receive the second control request from the second communication device user via the communication network. The second user and second communication device can be located inside the vehicle, and can be connected to the vehicle control system via the micro communication network, or can be located in a remote location outside of the vehicle, and can be connected to the vehicle control system via the macro communication network.

At 806, a determination can be made regarding whether the second control request conflicts with the first control request. The function manager component can analyze the first control request and the second control request, a first subset of access and control rights associated with the first user and first communication device, and a second subset of access and control rights associated with the second user and second communication device.

The function manager component can determine whether the first user and first communication device have a right to control the function as requested in the first control request. The function manager component also can determine whether the second user and second communication device have a right to control the function as requested in the second control request. In response to determining that the first user and first communication device have the right to control the function as requested in the first control request, and determining that the second user and second communication device have the right to control the function as requested in the second control request, the function manager component can determine whether the second control request conflicts with the first control request.

At 808, in response to determining that the second control request conflicts with the first control request, the conflict between the second control request and the first control request can be resolved to grant the first control request and deny the second control request based at least in part on respective priority rankings associated with the first control request and the second control requests, the result of a negotiation between the first user, the second user, and the vehicle operator (and/or vehicle control system), and/or defined control criteria relating to resolving conflicts between control requests to control a function associated with the vehicle. In some implementations, the function manager component can resolve the conflict between the second control request and the first control request, granting the first control request and denying the second control request, based at least in part on, for example, a first priority ranking associated with the first control request being higher than the second control request, in accordance with defined control criteria. For example, due to a first subscription to the vehicle service associated with the first user and a second subscription to the vehicle service associated with the second user, the first user may have a higher priority ranking than the second user with regard to control rights to control the function (e.g., the first user has a higher level of vehicle service than the second user based on their respective subscriptions). The function manager component can identify that the first user has the higher priority ranking and can grant the first control request of the first user and deny the second control request of the second user based at least in part on the first control request being associated with a higher priority ranking than the second control request.

In other implementations, the function manager component can resolve the conflict between the second control request and the first control request, granting the first control request and denying the second control request, based at least in part on the result of a negotiation between the first user, the second user, and the vehicle operator, in accordance with defined control criteria. For example, the function manager component can facilitate a negotiation regarding the conflicting control requests between the first user via the first communication device, the second user via the second communication device, and the vehicle operator (and/or vehicle control system). The first user, second user, and vehicle operator (and/or vehicle control system) can communicate between each other to try to reach an agreement to resolve the conflict between the control requests, for example, by granting the first control request over the second control request, by granting the second control request over the first control request, or by mutually agreeing to a different control request that is acceptable to the first user, second user, and vehicle operator (and/or the vehicle control system). For example, the first user, second user, and vehicle operator (and/or the vehicle control system) can agree to grant the first control request of the first user over the second control request of the second user.

In still other implementations, the function manager component can resolve the conflict between the second control request and the first control request, granting the first control request and denying the second control request, based at least in part on the defined control criteria relating to resolving conflicts between control requests to control the function associated with the vehicle. For example, a defined control criterion can indicate that, between two otherwise valid control requests to the control the function received from two different users, the control request received first by the vehicle control system is to be granted over the other conflicting control request. As another example, another defined control criterion can indicate that, between two control requests to the control the function received from two different users, if the first control request is determined to not violate a condition (e.g., an applicable law relating to vehicle speed, a time constraint(s) relating to transportation of users riding in the vehicle, a maximum volume level for presenting media to users in the vehicle, . . . ) relating to the function, and the second control request is determined to violate the condition, the first control request is to be granted over the second (and conflicting) control request.

Figure 9:
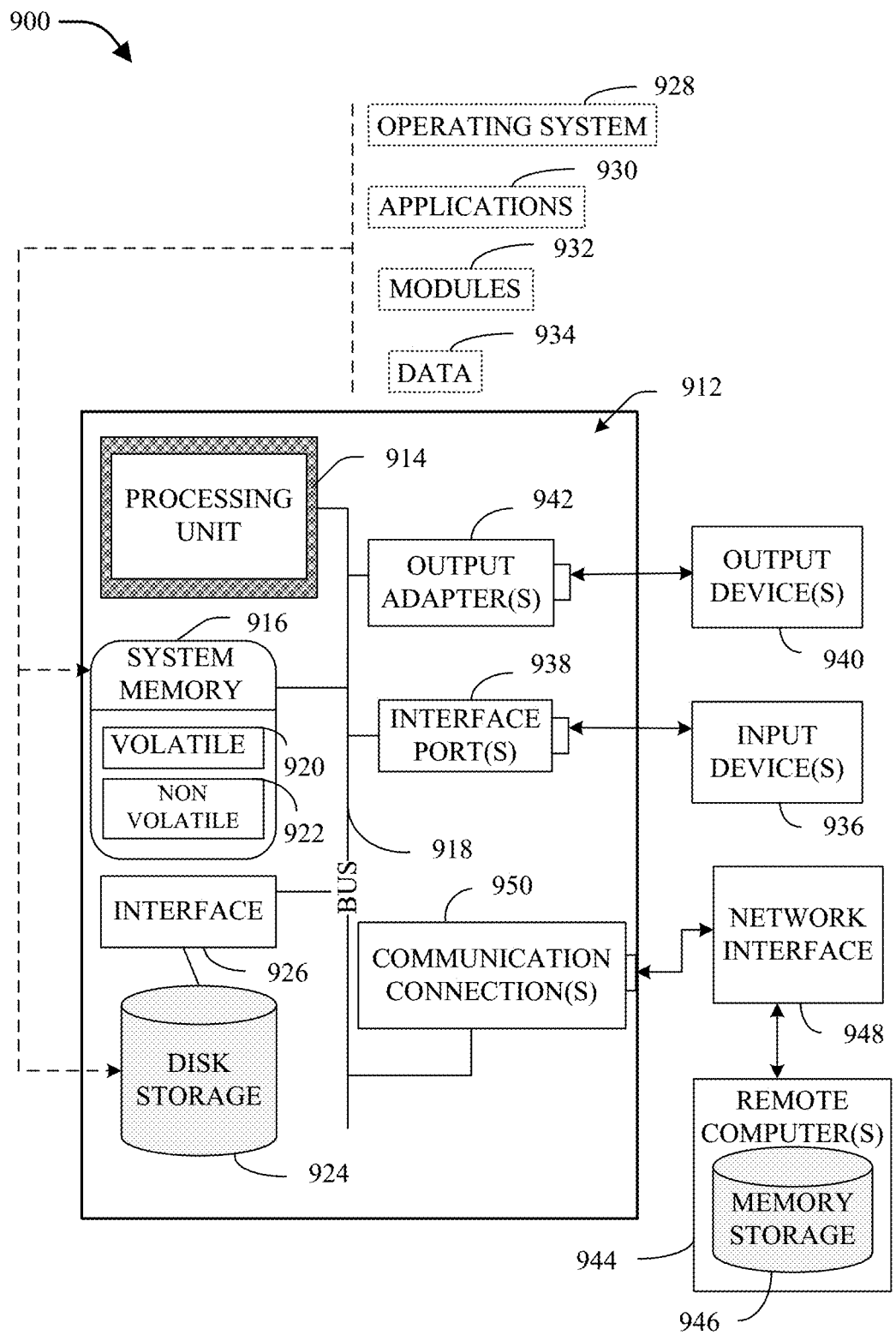
FIG. 9 is a schematic block diagram illustrating a suitable operating environment.
Figure 10:
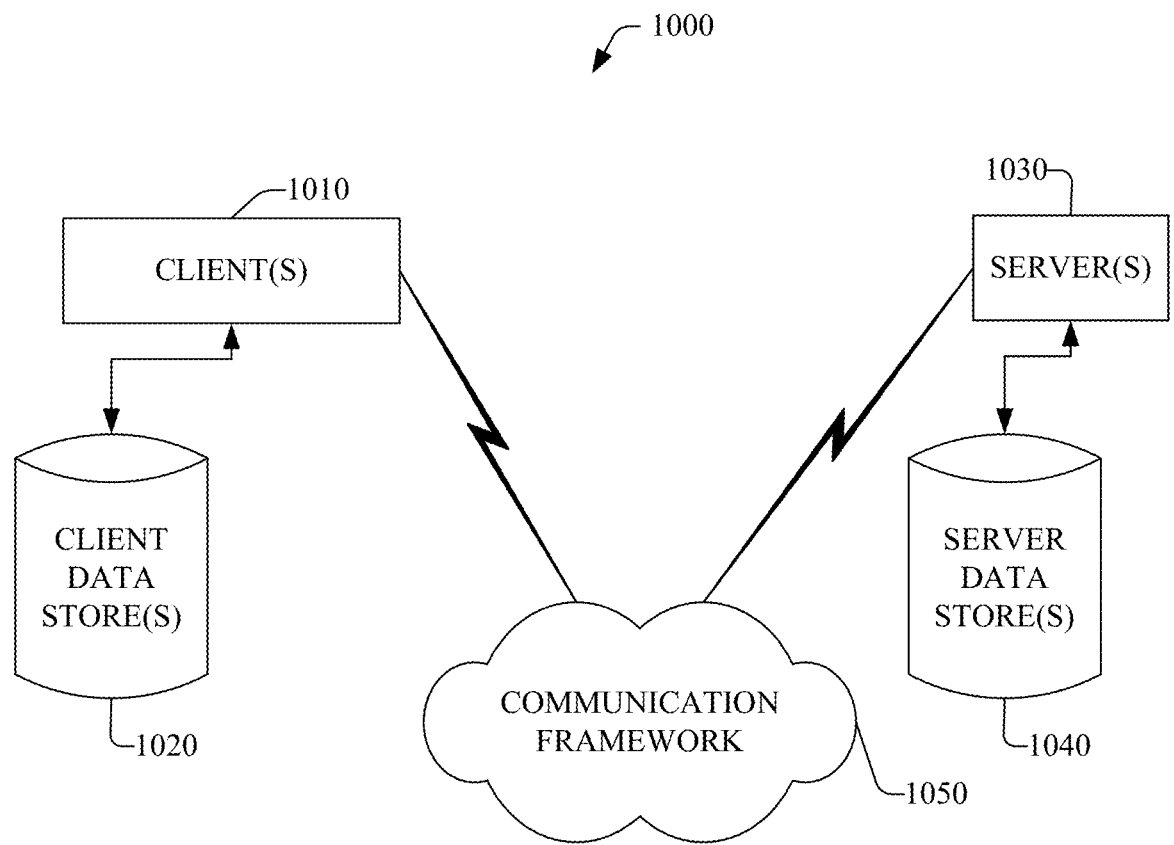
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., mobile phone, electronic tablets or pads, laptop computers, PDAs, . . . ), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 9, a suitable environment 900 for implementing various aspects of this disclosure includes a computer 912. The computer 912 includes a processing unit 914, a system memory 916, and a system bus 918. It is to be appreciated that the computer 912 can be used in connection with implementing one or more of the systems, components, or methods shown and described in connection with FIGS. 1-8, or otherwise described herein. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 920 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 also includes removable/non-removable, volatile/non-volatile computer storage media. FIG. 9 illustrates, for example, a disk storage 924. Disk storage 924 includes, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used, such as interface 926.

FIG. 9 also depicts software that acts as an intermediary between users and the basic computer resources described in the suitable operating environment 900. Such software includes, for example, an operating system 928. Operating system 928, which can be stored on disk storage 924, acts to control and allocate resources of the computer system 912. System applications 930 take advantage of the management of resources by operating system 928 through program modules 932 and program data 934 stored, e.g., in system memory 916 or on disk storage 924. It is to be appreciated that this disclosure can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 (e.g., computing system) with which the subject matter of this disclosure can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing this disclosure, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1020 that can be employed to store information local to the client(s) 1010. Similarly, the server(s) 1030 are operatively connected to one or more server data store(s) 1040 that can be employed to store information local to the servers 1030.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), BLU-RAY DISC (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., device, communication device, control component, vehicle control system, function manager component, central service component, communication network, macro communication network, micro communication network, processor component, data store, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   connecting, by a system comprising a processor, a first device associated with a first user identity to a second device of the system, wherein the system is integrated with a vehicle;
   based on control information relating to operation of the vehicle and received from the first device, determining, by the system, whether a modification of a travel route, on which the vehicle is to travel, conflicts with a destination time for the vehicle to arrive at a travel destination associated with a second user identity determined to be associated with being inside the vehicle, wherein a first result of the determining whether the modification of the travel route conflicts with the destination time is used to facilitate determining whether the modification of the travel route is to be implemented; and
   controlling, by the system, the operation of the vehicle based on a second result of the determining whether the modification of the travel route is to be implemented.

2. The method of claim 1, further comprising:
   receiving, by the system, the control information from the first device, wherein the control information relates to a first request associated with the first user identity that involves the modification of the travel route, and wherein a second request associated with the second user identity relates to the travel route and the destination time for the vehicle to arrive at the travel destination; and
   in response to determining that the modification of the travel route conflicts with the destination time for the vehicle to arrive at the travel destination associated with the second user identity, determining, by the system, whether to grant the first request, resulting in at least partially overriding the second request, and implement the modification of the travel route based on a defined control criterion relating to request grant determinations.

3. The method of claim 2, further comprising:
in response to determining that the first request is not to be granted based on the defined control criterion, determining, by the system, that the modification of the travel route is not to be implemented.

4. The method of claim 2, further comprising:
in response to determining that the first request is to be granted based on the defined control criterion, determining, by the system, that the modification of the travel route is to be implemented.

5. The method of claim 1, wherein the connecting of the first device comprises connecting the first device with the second device of the system via a wireless communication connection, wherein the control information is first control information, and wherein the method further comprises:
receiving, by the system, second control information from the first device, wherein the second control information relates to controlling a speed of the vehicle; and
in response to the receiving of the second control information, controlling, by the system, a function of the vehicle to control the speed of the vehicle, wherein a defined location inside of the vehicle comprises a group of controls for the controlling of the operation of the vehicle, including the speed of the vehicle, wherein the group of controls are integrated with the vehicle, wherein an area is located outside of the defined location inside of the vehicle, and wherein the first device is determined to be located in the area.

6. The method of claim 1, wherein the first device is located inside the vehicle, and wherein the connecting further comprises connecting the first device to the second device via a communication network of the vehicle.

7. The method of claim 1, wherein the first device is located outside of the vehicle, and wherein the connecting further comprises connecting the first device to the second device via a communication network associated with the vehicle.

8. The method of claim 1, further comprising:
receiving, by the system, authentication information from the first device;
authenticating, by the system, the first user identity based on a comparison of the authentication information with stored authentication information associated with an account of the first user identity;
authenticating, by the system, the first device based on an identification number associated with the first device; and
granting, by the system, control rights to the first user identity and the first device in response to authenticating the first user identity and the first device, wherein the control rights comprise a control right to control a function of the vehicle that is associated with the operation of the vehicle.

9. The method of claim 1, further comprising:
receiving, by the system, a first request to control a function associated with the vehicle from the first device;
receiving, by the system, a second request to control the function from a third device associated with the second user identity;
determining, by the system, that there is a conflict between the first request and the second request; and
resolving, by the system, the conflict based on a defined control criterion relating to request grant determinations.

10. The method of claim 9, further comprising:
determining, by the system, a first rank associated with the first user identity based on first control rights granted to the first user identity;
determining, by the system, a second rank associated with the second user identity based on second control rights granted to the second user identity; and
determining, by the system, that the first request has priority over the second request, in response to determining that the first rank is higher than the second rank, wherein the resolving comprises resolving the conflict by granting the first request and denying the second request based on the first rank having the priority over the second request.

11. The method of claim 9, further comprising:
facilitating, by the system, a negotiation regarding the first request and the second request between the first device and the third device, wherein the resolving comprises resolving the conflict by granting the first request and denying the second request based on a negotiation result of the negotiation.

12. A system, comprising:
a processor; and
a memory that stores executable instructions that, when executed by the processor, facilitate performance of operations, comprising:
associating a first device associated with a first user identity with a second device of the system, wherein the system is associated with a vehicle;
based on control data received from the first device, determining whether an adjustment to a travel route that the vehicle is to travel conflicts with a destination time for the vehicle to reach a destination of a second user identity associated with a user entity determined to be located inside the vehicle, wherein a first result of the determining whether the adjustment to the travel route that the vehicle is to travel conflicts with the destination time is utilized to facilitate determining whether the travel route is to be adjusted, wherein the adjustment is determined based on the control data; and
managing the travel route of the vehicle based on a second result of the determining whether the travel route is to be adjusted.

13. The system of claim 12, wherein the operations further comprise:
in response to determining that the adjustment to the travel route will not conflict with the destination time, determining that the travel route is to be adjusted based on the control data.

14. The system of claim 12, wherein the operations further comprise:
receiving the control data from the first device, wherein the control data relates to a first request associated with the first user identity and relating to the adjustment to the travel route, and wherein a second request associated with the second user identity relates to the destination time for the vehicle to reach the destination; and
in response to determining that the adjustment to the travel route conflicts with the destination time for the vehicle to reach the destination of the second user identity, determining whether to grant the first request over the second request and execute the adjustment to the travel route based a defined control criterion relating to request grant determinations.

15. The system of claim 14, wherein the operations further comprise:
in response to determining that the first request is not to be granted based on the defined control criterion, determining that the adjustment to the travel route is not to be executed.

16. The system of claim 14, wherein the operations further comprise:
in response to determining that the first request is to be granted based on the defined control criterion, determining that the adjustment to the travel route is to be executed.

17. The system of claim 12, wherein the associating of the first device with the second device comprises associating the first device with the second device of the system via a wireless communication channel, wherein the control data is first control data, and wherein the operations further comprise:
receiving second control data from the first device, wherein the second control data relates to controlling a function of the vehicle; and
controlling the function of the vehicle, based on the second control data, to facilitate controlling operation of the vehicle.

18. The system of claim 17, wherein the function relates to a vehicle component of a group of vehicle components of the vehicle comprising an accelerator, a brake, a gear, a steering mechanism, a navigation system, a climate control system, a media system, a display screen, a door lock, a window control, a light, a seat control, a moonroof, a sunroof, and a convertible roof, of the vehicle.

19. A non-transitory machine-readable storage medium, comprising executable instructions that, when executed by a processor, facilitate performance of operations, comprising:
communicatively connecting a first device associated with a first user identity to a second device associated with a vehicle control system of a vehicle;
based on control information received from the first device, determining whether a change to a travel route, on which the vehicle is to travel, conflicts with a destination time for the vehicle to arrive at a destination associated with a second user identity determined to be associated with being within a defined proximity to the vehicle, to facilitate determining whether the travel route is to be changed, wherein the change is determined based on the control information; and
controlling the travel route of the vehicle based on a result of the determining whether the travel route is to be changed.

20. The non-transitory machine-readable medium of claim 19, wherein the operations further comprise:
receiving the control information from the first device, wherein the control information relates to an adjustment of a parameter associated with a function of the vehicle that relates to operation of the vehicle;
determining whether the adjustment of the parameter associated with the function is permissible based on a first control right associated with the first user identity and a second control right associated with the second user identity; and
in response to determining that the adjustment of the parameter is permissible, adjusting the parameter associated with the function, based on the control information, to facilitate controlling the function of the vehicle, wherein the controlling of the function facilitates implementing the change to the travel route.

* * * * *